US008549526B2

(12) United States Patent
Yamamoto et al.

(10) Patent No.: US 8,549,526 B2
(45) Date of Patent: Oct. 1, 2013

(54) ACCESS CONTROL APPARATUS AND ACCESS CONTROL METHOD

(75) Inventors: Takashi Yamamoto, Fukuoka (JP); Yoshiaki Horinouchi, Fukuoka (JP); Manabu Tsukada, Fukuoka (JP); Takayuki Uchihira, Fukuoka (JP); Shinichi Hayashi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1281 days.

(21) Appl. No.: 12/046,740

(22) Filed: Mar. 12, 2008

(65) Prior Publication Data

US 2008/0235696 A1 Sep. 25, 2008

(30) Foreign Application Priority Data

Mar. 20, 2007 (JP) .................................. 2007-72203

(51) Int. Cl.
*G06F 9/46* (2006.01)

(52) U.S. Cl.
USPC .......................................... 718/103; 718/102

(58) Field of Classification Search
USPC .......................................... 718/102, 103, 104
See application file for complete search history.

(56) References Cited

U.S. PATENT DOCUMENTS

| | | | | |
|---|---|---|---|---|
| 5,327,557 A * | 7/1994 | Emmond | ........................ | 707/741 |
| 5,848,411 A | 12/1998 | Yamagishi | | |
| 6,145,031 A * | 11/2000 | Mastie et al. | ..................... | 710/52 |
| 6,326,985 B1 * | 12/2001 | Tazoe et al. | ..................... | 715/764 |
| 6,411,982 B2 * | 6/2002 | Williams | ........................ | 718/102 |
| 7,149,898 B2 * | 12/2006 | Marejka et al. | ............... | 713/176 |
| 7,155,716 B2 * | 12/2006 | Hooman et al. | ............... | 718/102 |
| 7,424,536 B2 * | 9/2008 | Hiramatsu et al. | ........... | 709/226 |
| 7,822,779 B2 * | 10/2010 | Chang et al. | ................... | 707/802 |
| 2003/0031096 A1 * | 2/2003 | Nathan et al. | ............... | 369/30.03 |
| 2003/0135575 A1 * | 7/2003 | Marejka et al. | ............... | 709/207 |
| 2005/0235106 A1 | 10/2005 | Kimura | | |
| 2006/0064405 A1 * | 3/2006 | Jiang et al. | ........................ | 707/3 |
| 2006/0080457 A1 * | 4/2006 | Hiramatsu et al. | ........... | 709/232 |
| 2006/0155705 A1 * | 7/2006 | Kamper et al. | ................... | 707/8 |
| 2008/0223918 A1 * | 9/2008 | Williams et al. | ............... | 235/379 |
| 2008/0228566 A1 * | 9/2008 | Williams et al. | ................ | 705/14 |

FOREIGN PATENT DOCUMENTS

| | | | |
|---|---|---|---|
| JP | 01154237 A | * | 6/1989 |
| JP | 07-073143 | | 3/1995 |
| JP | 08-241214 | | 9/1996 |
| JP | 2002358259 A | * | 12/2002 |
| JP | 2005-301854 | | 10/2005 |

* cited by examiner

*Primary Examiner* — Aimee Li

(74) *Attorney, Agent, or Firm* — Staas & Halsey LLP

(57) ABSTRACT

The disclosed access control apparatus and method controls an I/O device to perform processing of access requests in a predetermined order including inputting access requests from multiple tasks to cause the I/O device to perform file processing, storing and managing information about file priorities, obtaining a file priority corresponding to an access request, managing a queue having multiple queues for which the processing priorities corresponding to the file priorities are set and causing the access request to be stored in any of the queues corresponding to the file priority, and obtaining the access requests stored in the queues in an order based on the processing priorities set for the queues and sends the access requests to the I/O device.

18 Claims, 31 Drawing Sheets

ACCESS CONTROL APPARATUS AND ACCESS CONTROL METHOD

CROSS-REFERENCE TO RELATED APPLICATIONS

This application is related to and claims priority under 35 U.S.C §119(a) on Japanese Patent Application No. 2007-72203 filed on Mar. 20, 2007 in the Japan Patent Office, and incorporated by reference herein.

BACKGROUND

1. Field

The present invention relates to an access control apparatus and an access control method of controlling I/O access to file(s) in a multi-processor system.

2. Description of the Related Art

Recently, a multiprocessor system has been developed in which multiple CPUs (Central Processing Units) execute multiple tasks in parallel, as a technique for executing various tasks in a data processing system In this multi-processor system, resource conflicts among tasks frequently occur. However, since an I/O (Input/Output) access operation related to a file and the like in a general-purpose server and the like is a very low-speed operation, relative to programs operating in an internal memory of a data processing system, a large amount of time is spent for processing of tasks waiting to be processed once waiting for I/O processing occurs. Especially, if a high-priority task is delayed because of waiting for I/O processing, data processing of the multi-processor system is seriously influenced, and a large amount of delay in data processing is caused.

In a typical I/O (file) access control, FIFO (First In First Out) queue control is performed, and I/O access is permitted in an order in which requests for I/O access have been made. Therefore, there is a problem that an I/O request from a high-priority task is made to wait (is not given priority) because of an I/O request from a low-priority task.

Japanese Patent Laid-Open No. 2005-301854 discusses an information processing apparatus as described below. The information processing apparatus processes an I/O request from an application against a recording medium so as to control I/O accesses according to priorities of tasks. The information processing apparatus sets a specific priority for an I/O request from an application to store the I/O request into a queue, and processes the I/O request stored in the queue according to the priority.

Japanese Patent Laid-Open No. 8-241214 discusses a data processing system. When multiple tasks request to read the same file, the data processing system divides the file into blocks and changes the number of blocks to be read by each task according to the priority. Thereby, the data processing system processes the multiple tasks in parallel.

Japanese Patent Laid-Open No. 7-73143 discusses an input/output priority order control method. Using the input/output priority order control method, it is possible to automatically determine and change the input/output priority of each transaction on the basis of the number of processings of the transaction for each time period Then, using the input/output priority order control method, it is possible to perform access to a file apparatus on the basis of the changed input/output priorities.

SUMMARY

The disclosed access control apparatus and method controls an I/O device to perform file processing of access requests in a predetermined order.

The access control apparatus and method inputs access requests from multiple tasks to cause an I/O device to perform a file processing, stores and manages information about file priorities which are processing priorities assigned to files for processing the files, obtains a file priority corresponding to an access request, from the file priority management part, causes the access request to be stored in any of multiple queues for which the processing priorities corresponding to the file priorities are set based on the file priority obtained, and obtains the access requests stored in the queues in an order based on the processing priorities set for the queues and sends the access requests to the I/O device on a access-target file side.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
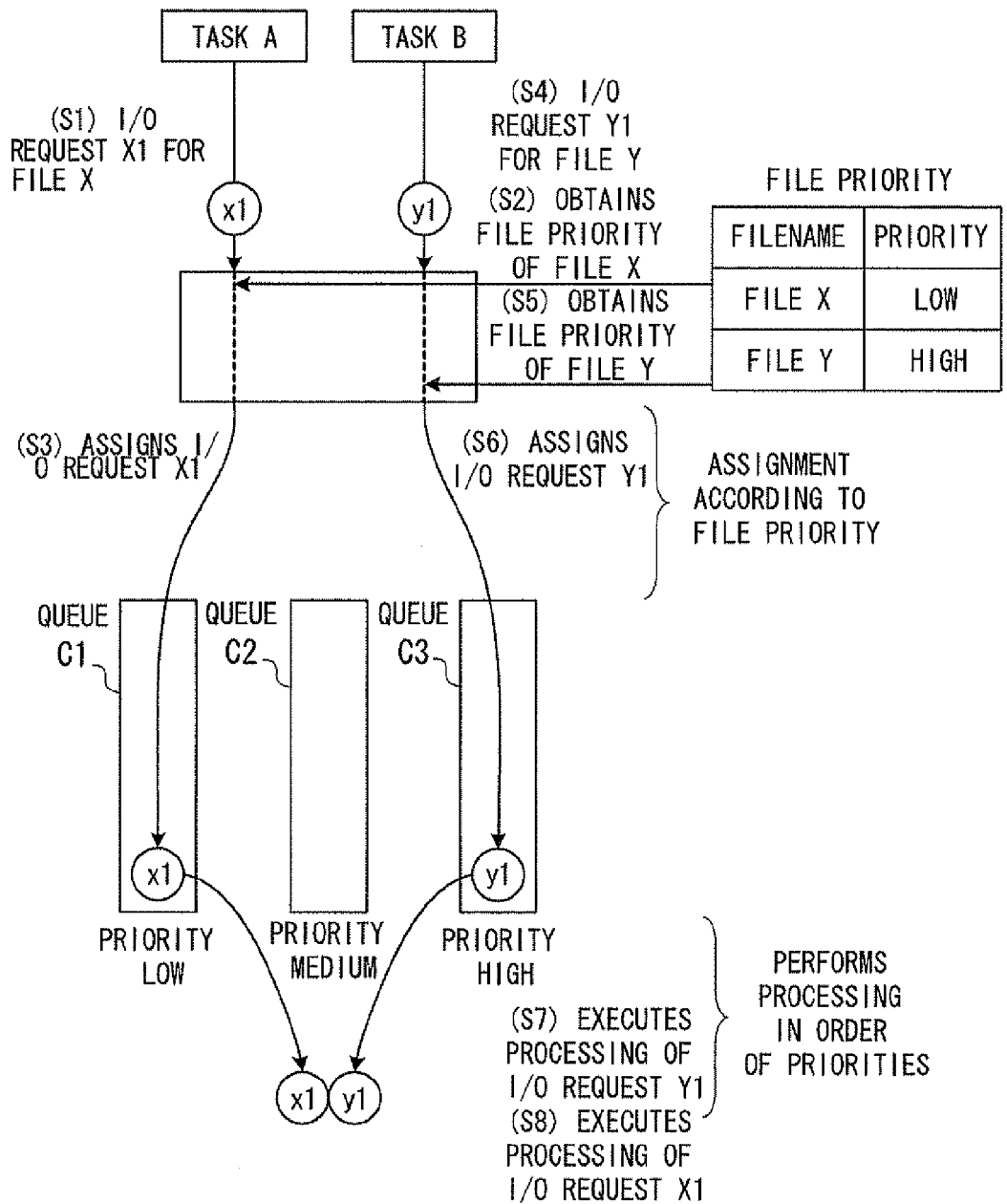
FIG. 1 is a diagram illustrating a concept of I/O access control.

Reference will now be made in detail to the embodiments, examples of which are illustrated in the accompanying drawings, wherein like reference numerals refer to the like elements throughout. The embodiments are described below to explain the present invention by referring to the figures.

Preferred embodiments of an access control apparatus and an access control method according to the present invention will be described in detail below with reference to accompanying drawings. The present invention is not limited by the embodiments.

First, a concept of I/O access control according to an embodiment will be described. FIG. 1 is a diagram illustrating the concept of the I/O access control according to an embodiment. In this embodiment, an I/O control apparatus has multiple queues (here, queues C1 to C3) for which processing priorities are set. When a request to access a file (I/O request) is made from a task, the I/O control apparatus assigns the I/O request to any of the queues on the basis of a processing priority set for each file (file priority).

For example, when an I/O request x1 for a file X is made from a task A (operation S1), the I/O control apparatus obtains a file priority of the file X from a file priority information table (operation S2). Then, the I/O control apparatus assigns the I/O request x1 to a queue corresponding to the file priority of the file X (operation S3). If the file priority of the file X is "low", the I/O request x1 is assigned to the queue corresponding to the priority "low" (here, the queue C1).

When an I/O request y1 for a file Y is made from a task B (operation S4), the I/O control apparatus obtains a file priority of the file Y from the file priority information table (operation S5). Then, the I/O control apparatus assigns the I/O request y1 to a queue corresponding to the file priority of the file Y (operation S6). If the file priority of the file Y is "high", the I/O request y1 is assigned to the queue corresponding to the priority "high" (here, the queue C3).

When executing processing of each I/O request, the I/O control apparatus executes the processing of I/O requests in the order of the highest to the lowest priorities on the basis of the processing priorities set for each of the queues. Specifically, the I/O control apparatus extracts I/O requests from the queues in the order of the queue C3 corresponding to the priority "high", the queue C2 corresponding to the priority "medium" and the queue C1 corresponding to the priority "low" and executes processing thereof. Here, the I/O request y1 is stored in the queue C3 corresponding to the priority "high", no I/O request is stored in the queue C2 corresponding to the priority "medium", and the I/O request x1 is stored in the queue C1 corresponding to the priority "low". Therefore, the I/O control apparatus first executes processing of the I/O request y1 (operation S7), and after that, it executes processing of the I/O request x1 (file processing) (operation S8). Thus, when writing data to a file, the I/O control apparatus of this embodiment can realize appropriate I/O control corresponding to the processing priority of the file while both preventing processing(s) from being reversed and preventing processing(s) from getting ahead of a processing.

Figure 2:
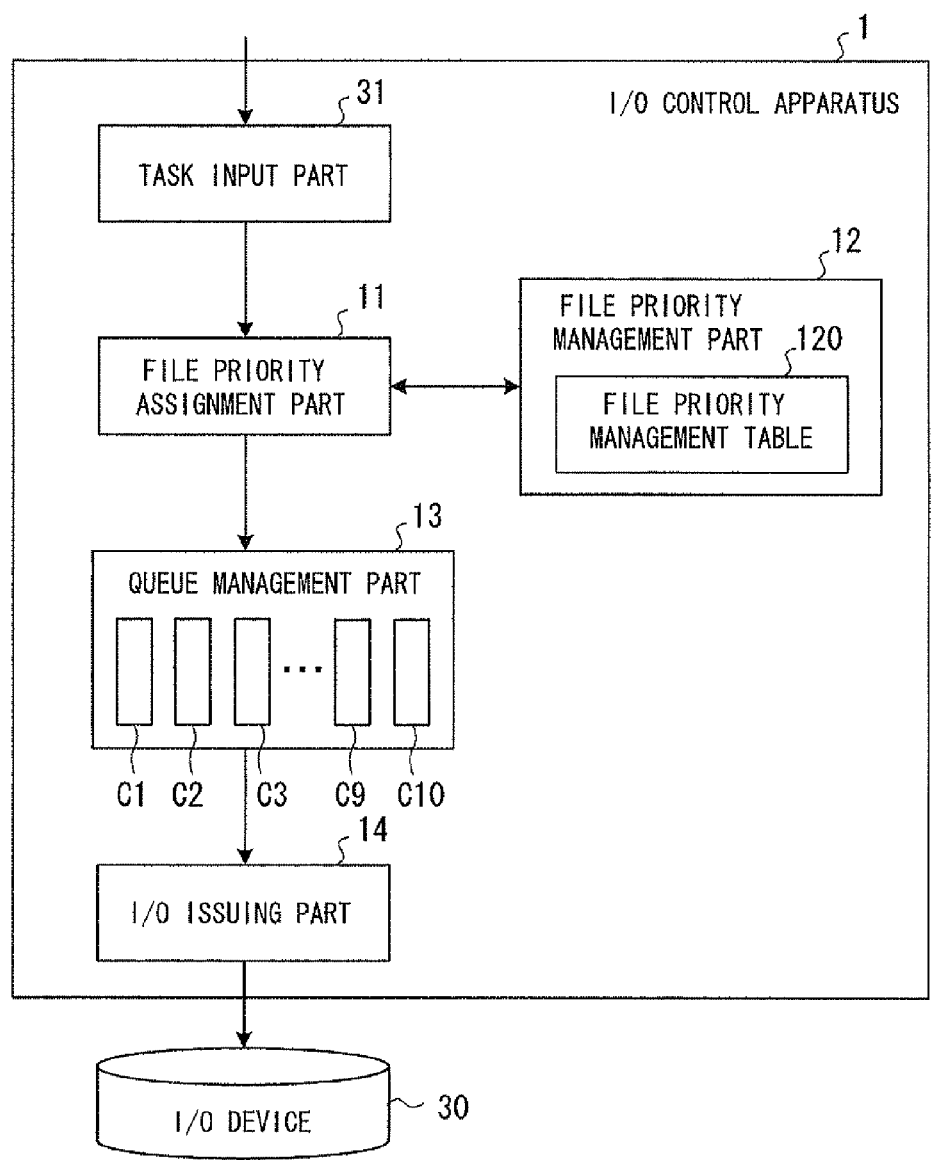
FIG. 2 is a block diagram illustrating a configuration of an I/O control apparatus.

FIG. 2 is a block diagram showing a configuration of an embodiment of the I/O control apparatus according to the present invention. The I/O control apparatus (access control apparatus) 1 is an apparatus for controlling an order of processing I/O requests in a multi-processor system in which multiple CPUs execute multiple tasks in parallel. The I/O control apparatus 1 includes a task input part 31, a file priority assignment part (file priority obtaining part) 11, a file priority management part 12, a queue management part 13, and an I/O issuing part (access request sending part) 14. The task input part 31 inputs (receives) an I/O request sent from a task and sends the I/O request to the file priority assignment part 11.

The file priority assignment part 11 is connected with the task input part 31, the file priority management part 12 and the queue management part 13. The file priority assignment part 11 receives an I/O request from a task via the task input part 31. The file priority assignment part 11 inquires of the file priority management part 12 about a file priority corresponding to the received I/O request (file) and obtains the file priority from the file priority management part 12. The file priority assignment part 11 sends the file priority obtained from the file priority management part 12 and the I/O request received from the task, to the queue management part 13.

In the file priority management part 12, there is stored a file priority management table (a table showing correspondence between a file and a file priority) 120 in which a file priority is set for each file. When an inquiry about a file priority is made by the file priority assignment part 11, the file priority management part 12 extracts a file priority corresponding to I/O request (file) from the file priority management table 120 and responds to the file priority assignment part 11 with the extracted file priority.

The file priority management table 120 is an information table in which a filename (or any identifier corresponding to a file) of each file and a file priority corresponding to the file are associated with each other. In the file priority management table 120, each file is set to any of, for example, file priorities (1) (the lowest priority) to (10) (the highest priority).

The queue management part 13 has multiple queues corresponding to the file priorities (queues for which processing priorities are set). The queue management part 13 puts the I/O request sent from the file priority assignment part 11 into a queue corresponding to the file priority sent from the file priority assignment part 11. Here, description will be made on a case where the queue management part 13 has queues C1 to C10 as queues corresponding to the file priorities. As for the queues of the queue management part 13, an order of the queues C1 to C10 indicates the order of the lowest to the highest priorities. Therefore, the priority of processing the queue C1 is the lowest, and the priority of processing queue C10 is the highest. Each of a file priority 1 to a file priority 10 of the file priority management table 120 corresponds to each of the queues C1 to C10.

The I/O issuing part 14 is connected with the queue management part 13. The I/O issuing part 14 takes out I/O requests stored in the queues C1 to C10 in the queue management part 13 and sends the I/O requests to an I/O device 30. Here, the I/O issuing part 14 sequentially extracts I/O requests starting from a queue with a highest processing priority to a queue with a lowest processing priority, and sends the I/O requests to the I/O device 30. The I/O device 30 is a device for I/O processing of files, and performs the I/O processing of files on the basis of the I/O requests sent from the I/O issuing part 14.

Figure 3:
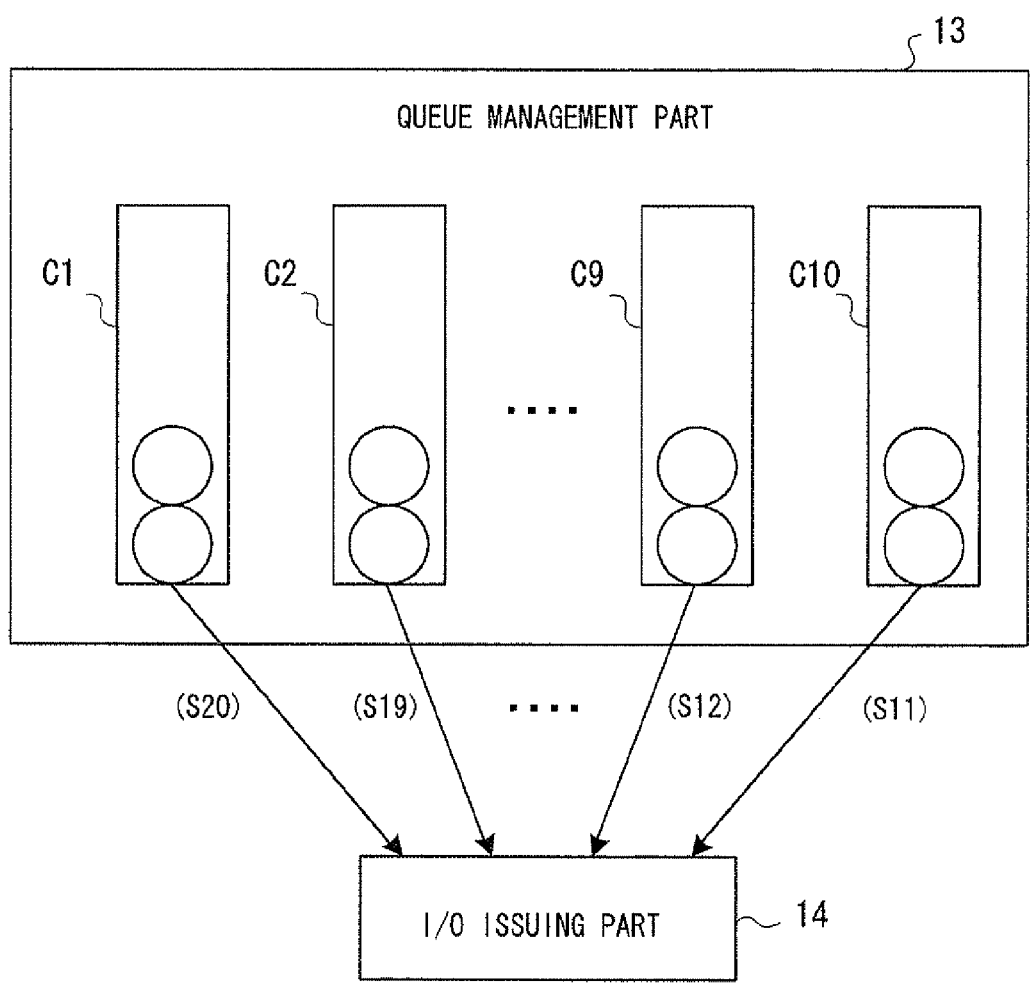
FIG. 3 is a diagram illustrating operation(s) of a queue management part and an I/O issuing part.

Now, operation(s) of the queue management part 13 and the I/O issuing part 14 will be described. FIG. 3 is a diagram for illustrating operation(s) of the queue management part 13 and the I/O issuing part 14. I/O requests from tasks are stored into the queues C1 to C10 in the queue management part 13. The I/O request is stored into any of the queues C1 to C10 on the basis of a file priority corresponding to a file which is an object of the I/O request. An I/O request for a file with a high processing priority is stored into a queue with a high processing priority, and an I/O request for a file with a low processing priority is stored into a queue with a low processing priority.

The I/O issuing part 14 sequentially takes out I/O requests from the queues C1 to C10 in the queue management part 13 and sends the I/O requests to the I/O device 30. In other words, the I/O issuing part 14 here preferentially sends an I/O request of a queue with a higher processing priority to the I/O device 30. The I/O issuing part 14 first sends all the I/O requests stored in a queue with the highest priority to the I/O device 30 in the order of being stored into the queue. After that, when there is no I/O request remaining in the queue with the highest priority, the I/O issuing part 14 sends the I/O requests in the queue with the next highest priority to the I/O device 30. Then, similarly, the I/O issuing part 14 takes out all the I/O requests with a queue with the next highest processing priority to a queue with a queue with the lowest processing priority, and sends the I/O requests to the I/O device 30.

Specifically, the I/O issuing part 14 first extracts I/O requests from the queue C10 which has the highest processing priority and sends the I/O requests to the I/O device 30 (operation S11). After that, the I/O issuing part 14 extracts I/O requests from the queue C9 and sends the I/O requests to the I/O device 30 (operation S12). Then, similarly the I/O issuing part 14 extracts I/O requests in the order of the highest to the lowest processing priorities (in the order of the queue C8 to the queue C3) and sends the I/O requests to the I/O device 30. Furthermore, the I/O issuing part 14 extracts I/O requests from the queue C2 and sends the I/O requests to the I/O device 30 (operation S19), and finally, it extracts I/O requests from the queue C1 with the lowest processing priority and sends the I/O requests to the I/O device 30 (operation S20).

Figure 4:
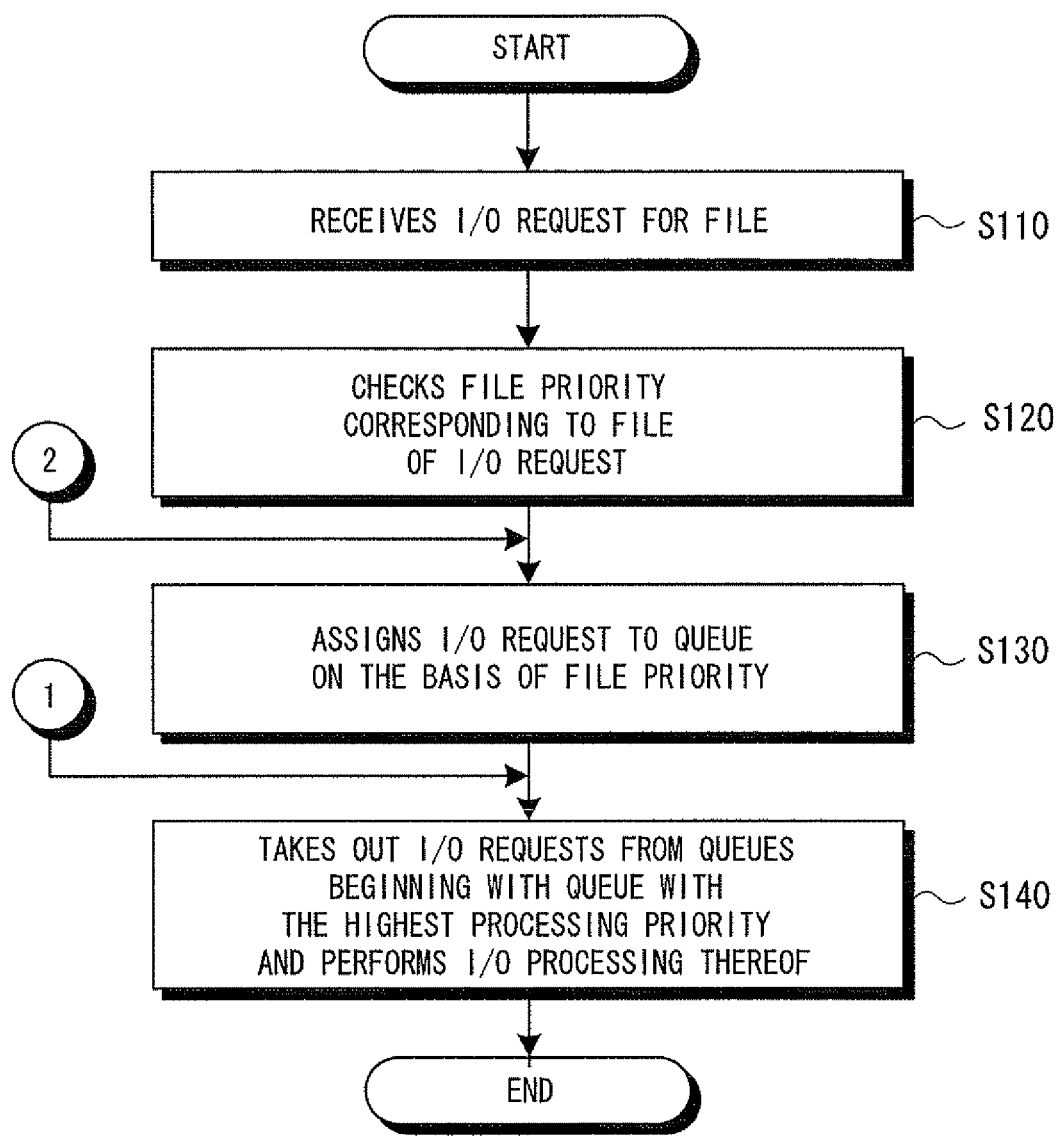
FIG. 4 is an operation flow illustrating an operation procedure of an I/O control apparatus.

Next, an operation procedure of the I/O control apparatus 1 according to an embodiment will be described. FIG. 4 is an operation flow showing the operation procedure of the I/O control apparatus according to this embodiment. When an I/O request for a file is issued from a task, the I/O control apparatus 1 receives the I/O request by the task input part 31 (operation S110).

The task input part 31 sends the received I/O request to the file priority assignment part 11, and the file priority assignment part 11 receives the I/O request from the task input part 31. The file priority assignment part 11 checks (determines) a file priority corresponding to the received I/O request (file). The file priority assignment part 11 here checks the file priority by inquiring of the file priority management part 12 about the file priority (operation S120). The file priority management part 12 extracts the file priority corresponding to the I/O request from the file priority management table 120 and responds to the file priority assignment part 11 with the file priority.

The file priority assignment part 11 sends the file priority obtained from the file priority management part 12 and the I/O request received from the task to the queue management part 13. The queue management part 13 causes the I/O request handed over by the file priority assignment part 11 to be stored into a queue corresponding to the file priority handed over by the file priority assignment part 11. Thus, the queue management part 13 assigns the I/O request to a queue (any of the queues C1 to C10) on the basis of the file priority corresponding to the I/O request (operation S130).

The I/O issuing part 14 sequentially takes out (retrieves) I/O requests stored in the queues C1 to C10 in the queue management part 13, beginning with a queue with the highest processing priority, and sends the I/O requests to the I/O device 30. Then, the I/O device 30 performs I/O processing of files corresponding to the I/O requests (operation S140).

Figure 5:
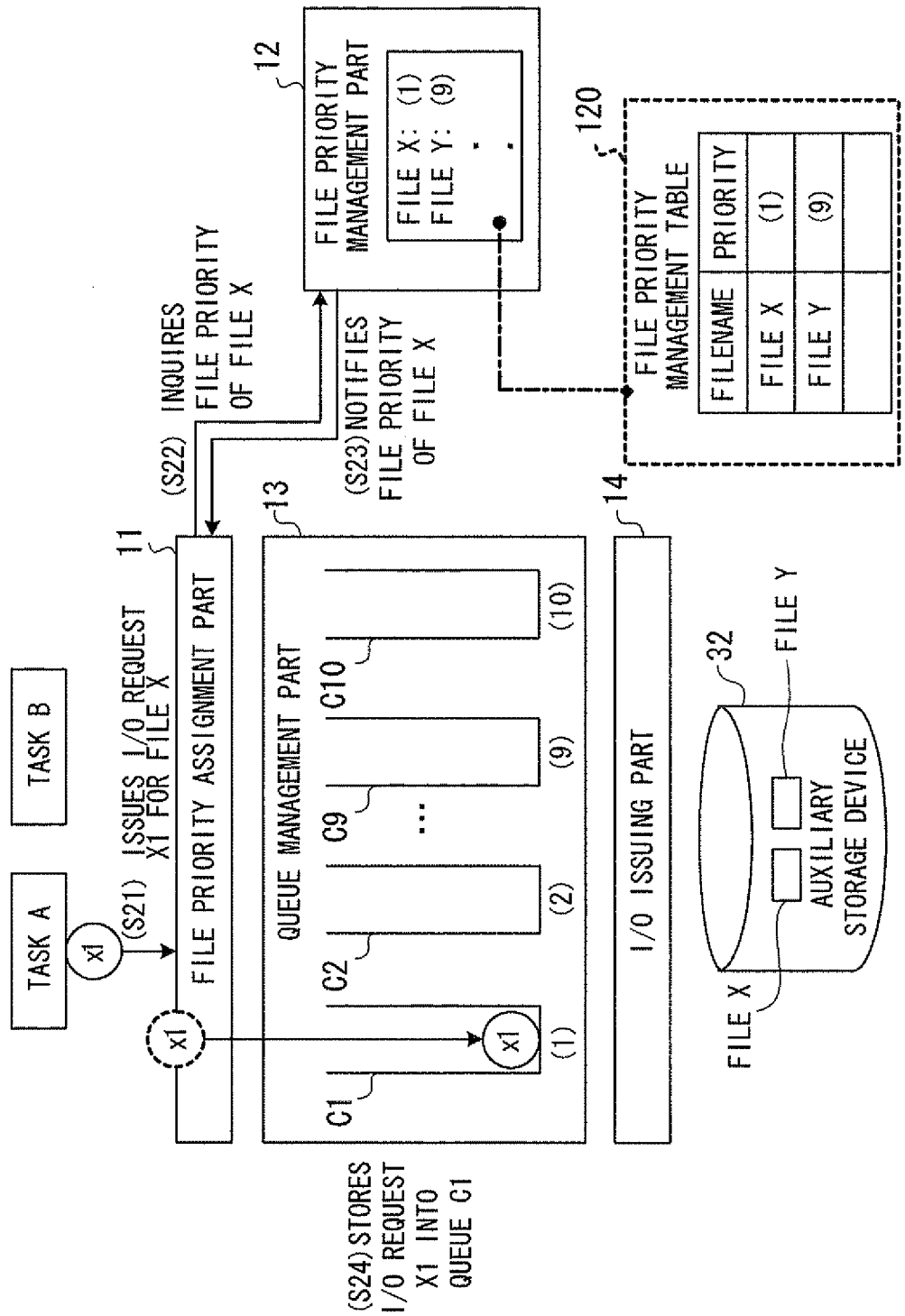
FIG. 5 is a diagram illustrating a processing procedure for an I/O access control of an I/O control apparatus of an embodiment.
Figure 6:
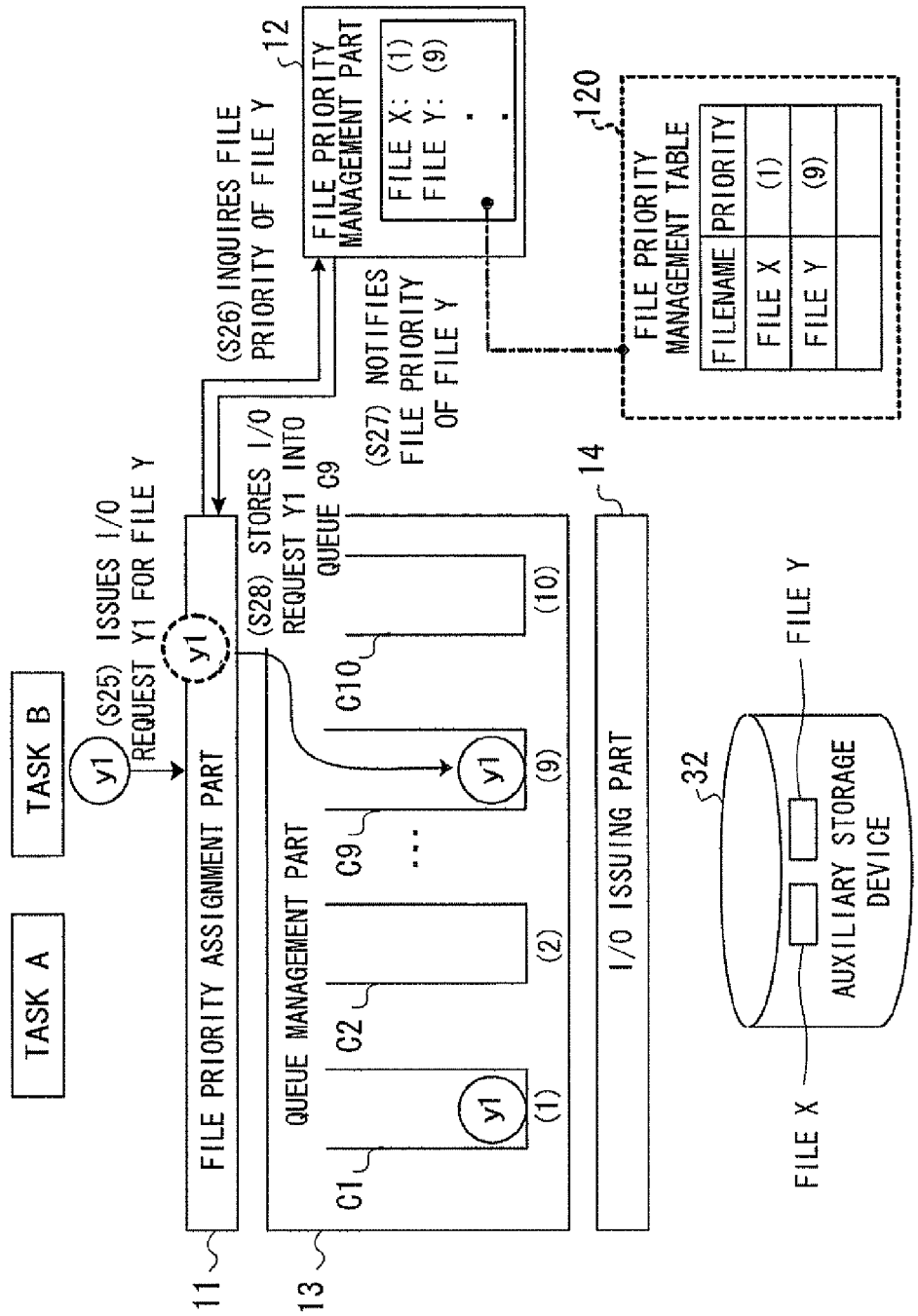
FIG. 6 is a diagram illustrating a processing procedure for an I/O access control of an I/O control apparatus of an embodiment.
Figure 7:
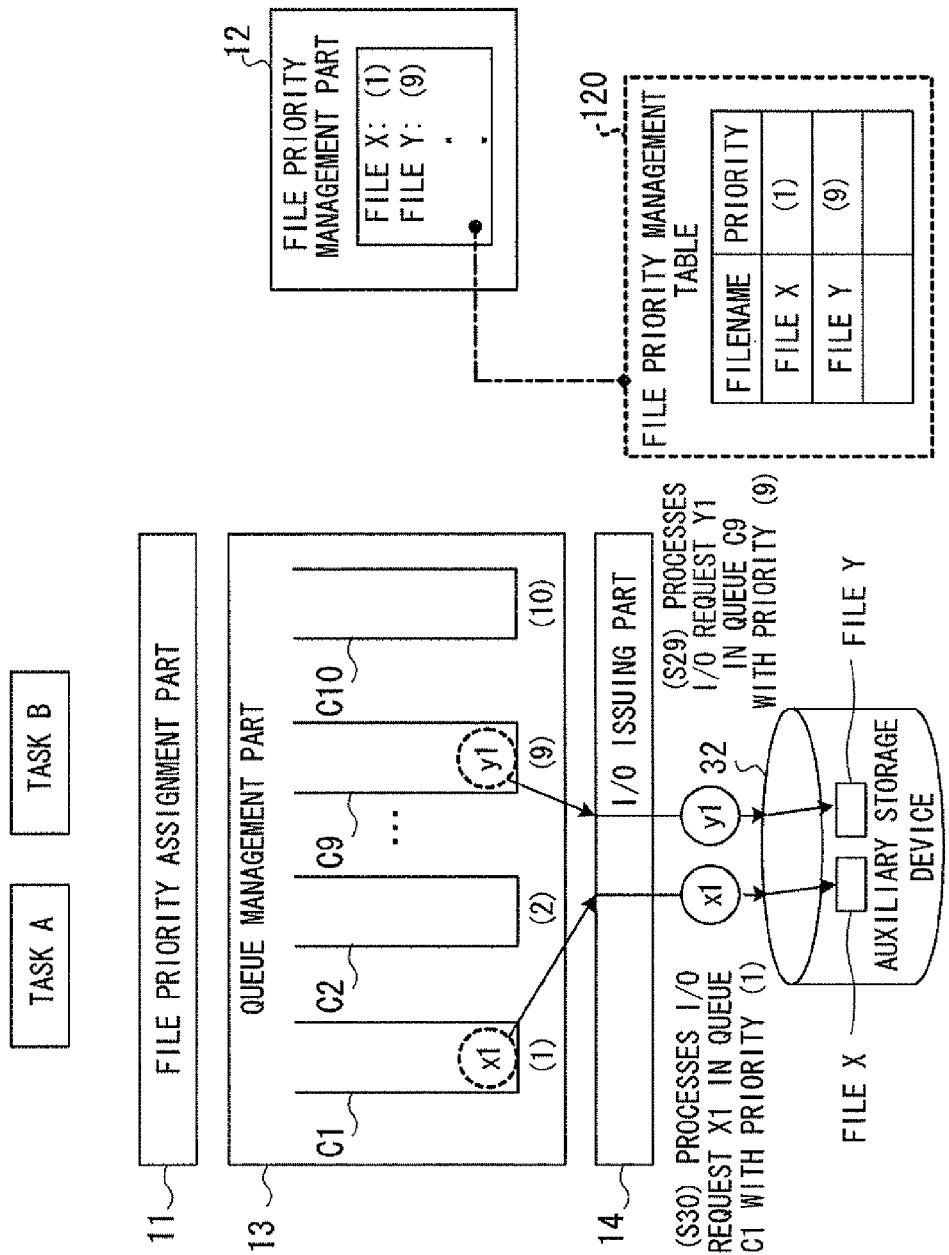
FIG. 7 is a diagram illustrating s processing procedure for an I/O access control of an I/O control apparatus of an embodiment.

Next, description will be made on a detailed processing procedure for the I/O access control by the I/O control apparatus 1 according to an embodiment. FIGS. 5 to 7 are diagrams illustrating a processing procedure of an I/O access control by the I/O control apparatus.

Here, description will be made on a case where there are two tasks A and B, and, after the task A issues an I/O request for a file X (with a file priority 1), the task B issues an I/O request for a file Y with a file priority higher than that of the file X (a file priority 9). While file priorities are described using numerical value(s), the invention is not limited to any type of indication for associating a file with a priority.

As shown in FIG. 5, when the task A issues an I/O request x1 for the file X, the file priority assignment part 11 receives the I/O request x1 (operation S21). The file priority assignment part 11 inquires of the file priority management part 12 about a file priority of the file X (operation S22).

The file priority management part 12 searches the file priority management table 120 to extract priority of the file (X) which in this case is file priority 1. The file priority management part 12 sends or provides a notification of the extracted file priority 1 to the file priority assignment part 11 (operation S23).

The file priority assignment part 11 hands the I/0 request x1 for the file X and the file priority 1 of the file X over to the queue management part 13. The queue management part 13 stores the I/O request x1 received from the file priority assignment part 11 into the queue C1 corresponding to the file priority 1 received from the file priority assignment part 11 (operation S24).

Next, as shown in FIG. 6, when a task B issues an I/O request y1 for a file Y, the file priority assignment part 11 receives the I/O request y1 similarly to the case where the task A accesses the file X (operation S25). The file priority assignment part 11 inquires of the file priority management part 12 about the file priority of the file Y (operation S26).

The file priority management part 12 searches the file priority management table 120 to a corresponding priority of the Y, which in this case is file priority 9. The file priority management part 12 notifies the extracted file priority 9 to the file priority assignment part 11 (operation S27).

The file priority assignment part 11 hands the I/O request y1 for the file Y and the file priority 9 of the file Y over to the queue management part 13. The queue management part 13 stores the I/O request y1 received from the file priority assignment part 11 into the queue C9 corresponding to the file priority 9 received from the file priority assignment part 11 (operation S28).

Next, as shown in FIG. 7, the I/O issuing part 14 first checks (or determines) whether an I/O request is stored in the queue C10 with the file priority 10 which has the highest priority. If determines that a I/O request is stored in the queue C10, the I/O issuing part 14 hands all the I/O requests stored in the queue C10 with the file priority 10 over to an auxiliary storage device 32 (a device for storing the file X and the file Y) of the I/O device 30 in an order the I/O requests are stored into the queue C10. When determining that there is no I/O request remaining in the queue C10 with the file priority 10, the I/O issuing part 14 hands I/O requests in the queue C9 with the file priority 9 which have the next highest priority over to the auxiliary storage device 32. Since in this example the I/O request y1 is stored in the queue C9, the I/O request y1 in the queue C9 is handed over to the auxiliary storage device 32, and I/O processing of the file Y is executed (operation S29).

Then, if any I/O request is stored in the queues C8 to C2, the I/O issuing part 14 hands all the I/O requests stored in each of the queues C8 to C2 with the file priorities 8 to 2, respectively, over to the auxiliary storage device 32 in an order the I/O requests are stored into the queues C8 to C2. The I/O issuing part 14 finally hands the I/O requests in the queue C1 with the file priority 1 which is the lowest priority over to the auxiliary storage device 32. Since the I/O request x1 is stored in the queue C1 in this example, the I/O request x1 in the queue C1 is handed over to the auxiliary storage device 32, and I/O processing of the file X is executed (operation S30).

Thus, the I/O request y1 for the file Y with a higher file priority is handed over to the auxiliary storage device 32 prior to the I/O request x1 for the file X with a lower file priority. Accordingly, I/O processing of an I/O request for the file Y is performed prior to I/O processing of an I/O request for the file X.

Though description has been made on the case where the queue management part 13 has the ten queues C1 to C10 in this embodiment, the present invention is not limited to any number of queues, for example, a configuration is also possible in which the queue management part 13 has two to nine queues or eleven or more queues.

As described above, in an embodiment, if an I/O (file) access conflict occurs between a task with a high processing priority and a task with a low processing priority, the order of processing the I/O requests is controlled according to files (according to the kinds of file) corresponding to the I/O requests. Therefore, in the case of a reading request for a file, the disclosed I/O control apparatus can execute processing prior to processing of files with lower priorities. Furthermore, in the case of a writing request for a file, the I/O control apparatus of an embodiment performs priority control (control based on priorities) of all the I/O requests for a target file, and by the priority control, it can efficiently execute I/O processing. Accordingly, it is possible to improve the throughput of the file processing in the multi-processor system.

Next, another embodiment of the present invention will be described using FIGS. 8 to 11. In this embodiment, a file priority to be assigned to each file can be arbitrarily specified on a user's side. The I/O control apparatus of this embodiment changes file priorities on the basis of a user's instruction, and controls an order of processing I/O requests on the basis of the changed file priorities.

Figure 8:
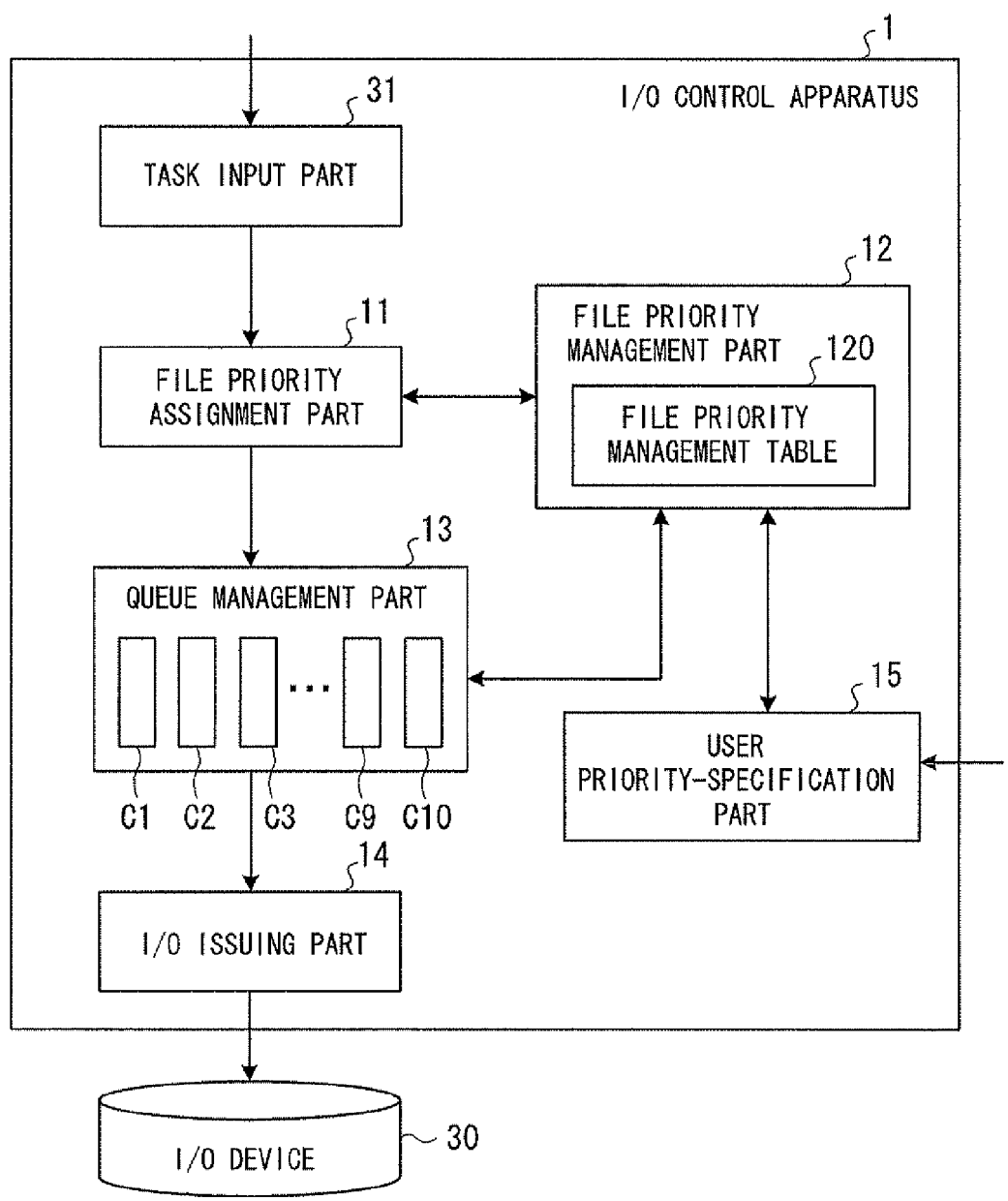
FIG. 8 is a block diagram illustrates another configuration of an I/O control apparatus.

FIG. 8 is a block diagram showing a configuration of an embodiment of an I/O control apparatus according to the present invention. Among the components in FIG. 8, components achieving functions similar to the I/O control apparatus 1 shown in FIG. 2 are given the same reference numerals, and redundant description thereabout will be omitted.

The I/O control apparatus 1 of this embodiment has a user priority-specification part (file priority registration part) 15 in addition to a task input part 31, a file priority assignment part 11, a file priority management part 12, a queue management part 13, and an I/O issuing part 14.

When receiving a file priority change instruction from a user, the user priority-specification part 15 inquires of the file priority management part 12 about a file priority corresponding to a file targeted by the change and obtains the file priority from the file priority management part 12. When there is a difference between the obtained result (the obtained file priority) and the file priority specified by the user, the user priority-specification part 15 makes a file priority change request (an instruction to update the file priority management table 120) to the file priority management part 12.

The file priority management part 12 here is connected with the user priority-specification part 15 and the queue management part 13. When the file priority change request (instruction) is sent from the user priority-specification part 15, the file priority management part 12 updates the file priority management table 120 and notifies the queue management part 13 that the file priority management table 120 has been changed (the file priority change request). Furthermore, when receiving a request to newly register a file and a file priority from the user priority-specification part 15, the file priority management part 12 adds the file and the file priority corresponding to the new registration request, to the file priority management table 120.

When receiving the file priority change request from the file priority management part 12, the queue management part 13 takes out all I/O requests, related to the file targeted by the change, from the queue of the file targeted by the change request (the queue in which the I/O requests before change are stored), and moves (adjusts) the I/O requests to a queue specified in the change request.

Figure 9:
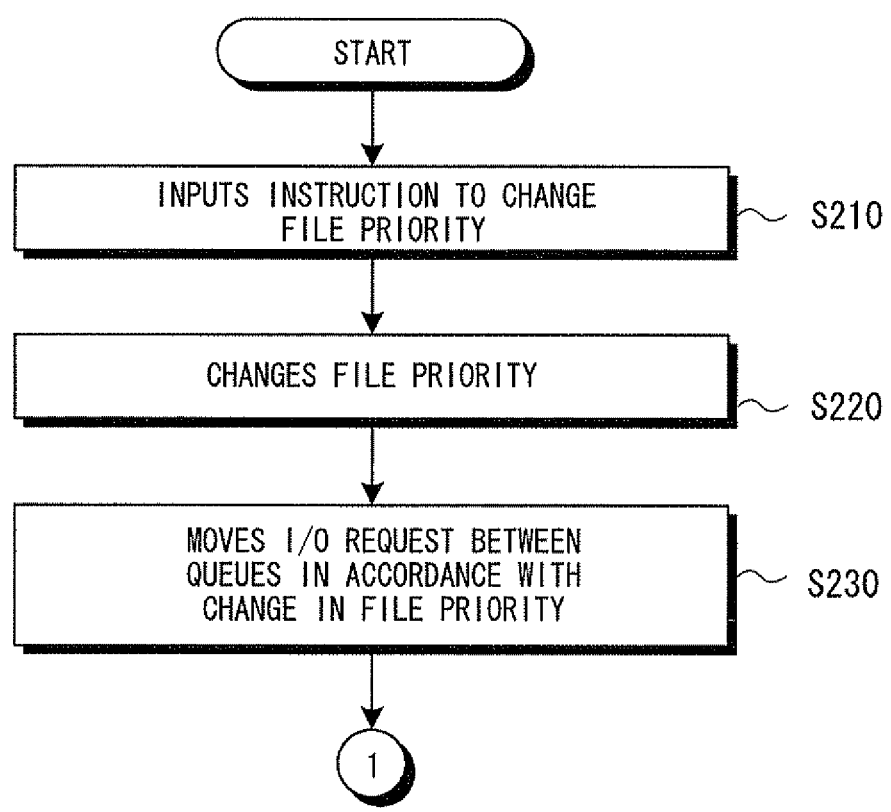
FIG. 9 is an operation flow illustrating an operation procedure of an I/O control apparatus.

Next, an operation procedure of the I/O control apparatus 1 according to the second embodiment will be described. FIG. 9 is an operation flow showing the operation procedure of the I/O control apparatus according to an embodiment. When a file priority change instruction is externally inputted by a users the user priority-specification part 15 requests the file priority management part 12 to change the file priority of the file for which the change instruction (registration instruction) has been made. Specifically, the user priority-specification part 15 sends the file priority change instruction to the file priority management part 12 (operation S210).

When receiving the file priority change instruction from the user priority-specification part 15, the file priority management part 12 changes the file priority in the file priority management table 120. The file priority management part 12 changes the file priority of the file specified by the change instruction and updates the file priority management table 120 (operation S220).

When having changed the file priority in the file priority management table 120, the file priority management part 12 instructs the queue management part 13 to move I/O requests related to the file for which the file priority has been changed, to a different queue corresponding to the changed file priority.

The queue management part 13 changes the queue in which the I/O requests are to be stored on the basis of the instruction from the file priority management part 12. The queue management part 13 here moves (adjusts order) the I/O requests targeted by the change between queues according to the changed file priority (operation S230) The queue management part 13 moves the I/O requests targeted by the change, for example, from a queue C1 to a queue C9.

After that, the processing of operation S140 shown in FIG. 4 is executed. That is, the I/O requests stored in the queues C1 to C10 in the queue management part 13 are sequentially taken out (retrieved), beginning with a queue with the highest processing priority, and I/O processing of files corresponding to the I/O requests is performed by the I/O device 30.

Figure 10:
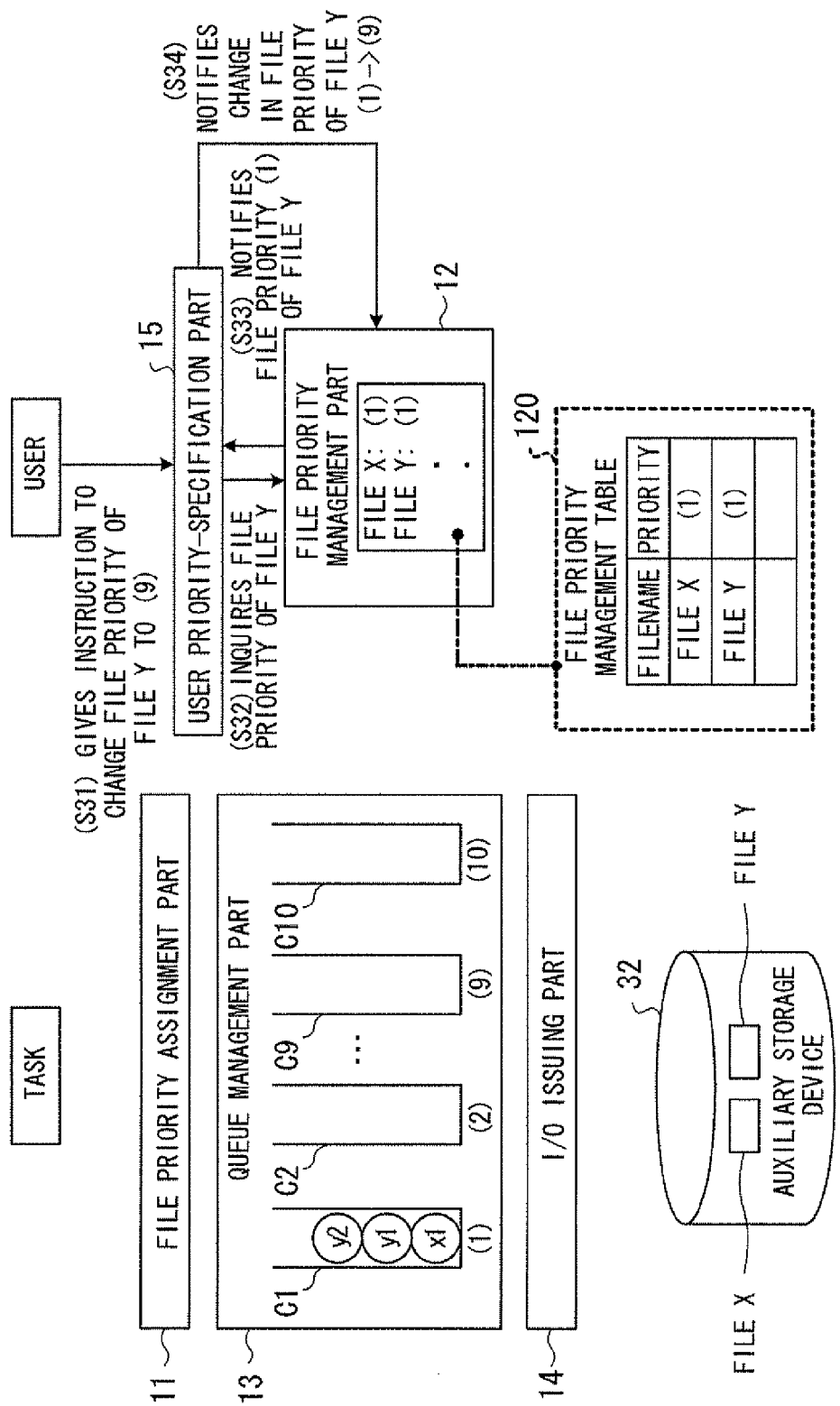
FIG. 10 is a diagram illustrating a processing procedure for an I/O access control of an I/O control apparatus of an embodiment.
Figure 11:
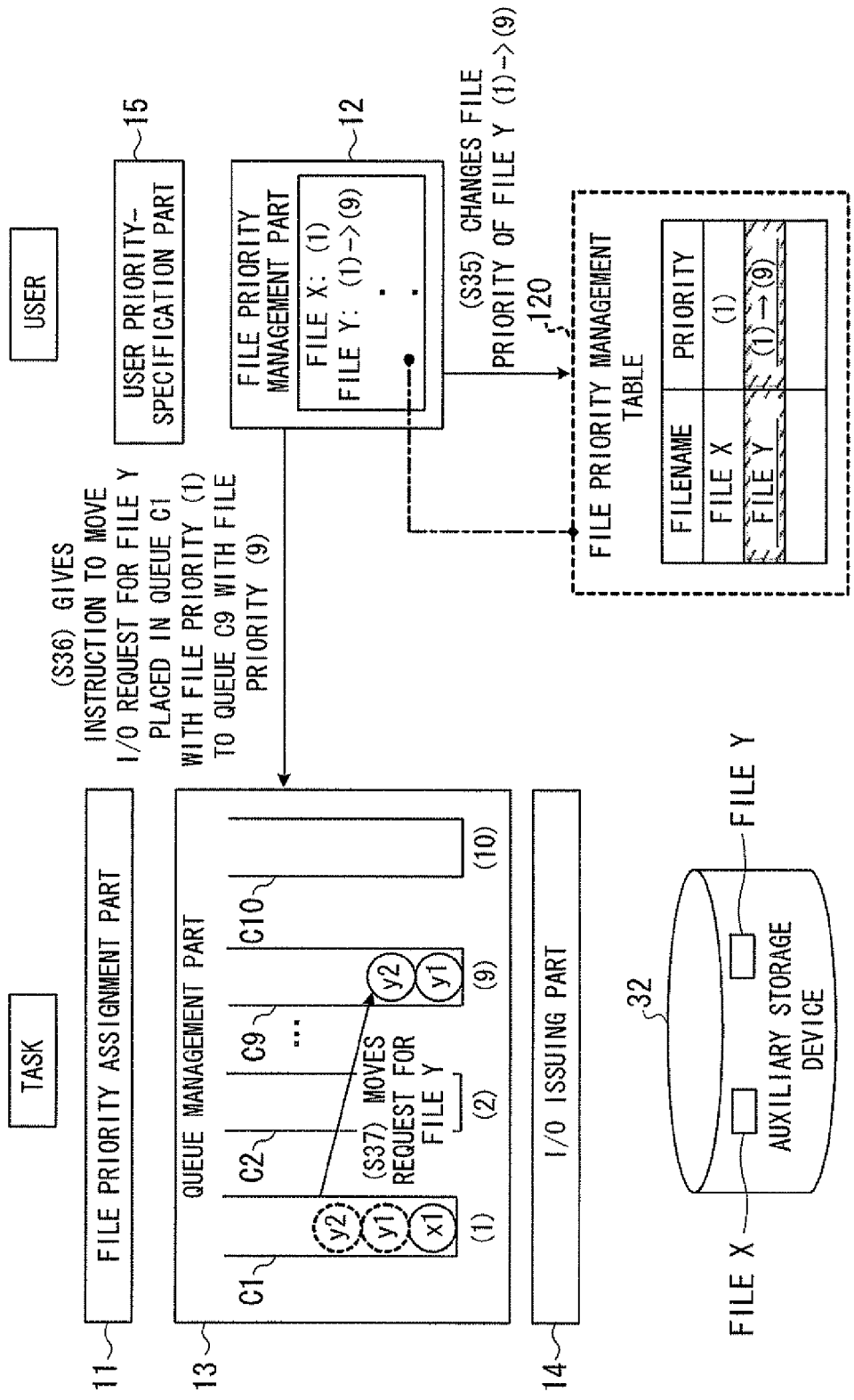
FIG. 11 is a diagram illustrating a processing procedure for an I/O access control of an I/O control apparatus of an embodiment.

Next, description will be made on a detailed processing procedure for the I/O access control by the I/O control apparatus 1 according to an embodiment. FIGS. 10 and 11 are diagrams for illustrating processing procedure(s) for an I/O access control by an I/O control apparatus according to an embodiment.

Here, description will be made on the case where, in a multi-processor system, file priorities of a file X and a file Y are set to 1, one I/O request x1 for the file X and two I/O requests y1 and y2 for the file Y are stored in the queue C1 with the file priority 1, and, in such a state, the file priority of the file Y is changed to 9.

In the description below, it is assumed that the I/O requests for the file X are issued in the order of the I/O request x1 the I/O request x2 and an I/O request x3 and processed in this order. Furthermore, it is assumed that the I/O requests for the file Y are issued in the order of the I/O request y1, the I/O request y2 and an I/O request y3 and processed in this order.

First, a user inputs an instruction to change the file priority of the file Y to the file priority 9, into the I/O control apparatus 1 with the use of either input unit such as a mouse and a keyboard or communication unit such as a LAN (local Area Network).

When the file priority change instruction is inputted into the I/O control apparatus 1 by the user, the user priority-specification part 15 receives this change instruction (operation S31). Then, the user priority-specification part 15 inquires of the file priority management part 12 about the file priority of the file Y (operation S32). Thus, the file priority management part 12 notifies the current file priority 1 of the file Y to the user priority-specification part 15 (operation S33).

The user priority-specification part 15 checks whether the current file priority of the file Y are different from the file priority specified by the user. Since the current file priority of the file Y is 1 and the file priority specified by the user is 9, it is determined that the current file priority is different from the file priority specified by the user. Therefore, the user priority-specification part 15 notifies the file priority management part 12 that the file priority of the file Y is to be changed to 9 (operation S34).

Next, as shown in FIG. 11, the file priority management part 12 changes the file priority of the file Y in the file priority management table 120 from 1 to 9 (operation S35). Then, the file priority management part 12 notifies the queue management part 13 that the file priority of the file Y has been changed from 1 to 9.

This notification from the file priority management part 12 to the queue management part 13 includes an instruction to the queue management part 13 to move a queue storing the I/O requests related to the file to a instructed queue. That is, an instruction to move the I/O requests for the file Y which are stored in the queue C1 corresponding to the file priority 1 to the queue C9 corresponding to the file priority 9 is sent from the file priority management part 12 to the queue management part 13 (operation S36).

When receiving the instruction to move the I/O requests, from the file priority management part 12, the queue management part 13 stops temporarily both to accepting I/O requests from the file priority assignment part 11 (assignment processing of I/O requests) and sending I/O requests to the I/O issuing part 14. Then, the queue management part 13 searches for all I/O requests related to the file Y which are stored in the queue C1 with the file priority 1, and moves the I/O requests y1 and y2 found by the search to the queue C9 with the file priority 9 (operation S37).

After that, the queue management part 13 resumes acceptance of I/O requests from the file priority assignment part 11 and sending of I/O requests to the I/O issuing part 14. Thus, it is possible to efficiently perform processing of I/O requests for files according to a file priority change instruction from a user. Any of the processing of S35 and the processing of S36 described with reference to FIG. 11 may be performed prior to the other. The processing of S35 and the processing of S36 may be performed at the same time.

As described above, it is possible for a user to arbitrarily change file priorities of files and to control an order of processing I/O requests for the files according to file priorities desired by the user.

Furthermore, since I/O requests are moved between queues after the I/O request assignment processing and the I/O request sending processing are temporarily stopped, it is possible to prevent a file processing from getting ahead of a file processing even when I/O requests are moved between queues.

Next, another embodiment of the present invention will be described with the use of FIGS. 12 to 17. In this embodiment, an order of processing I/O requests is controlled on the basis of file priorities corresponding to file access frequencies.

Figure 12:
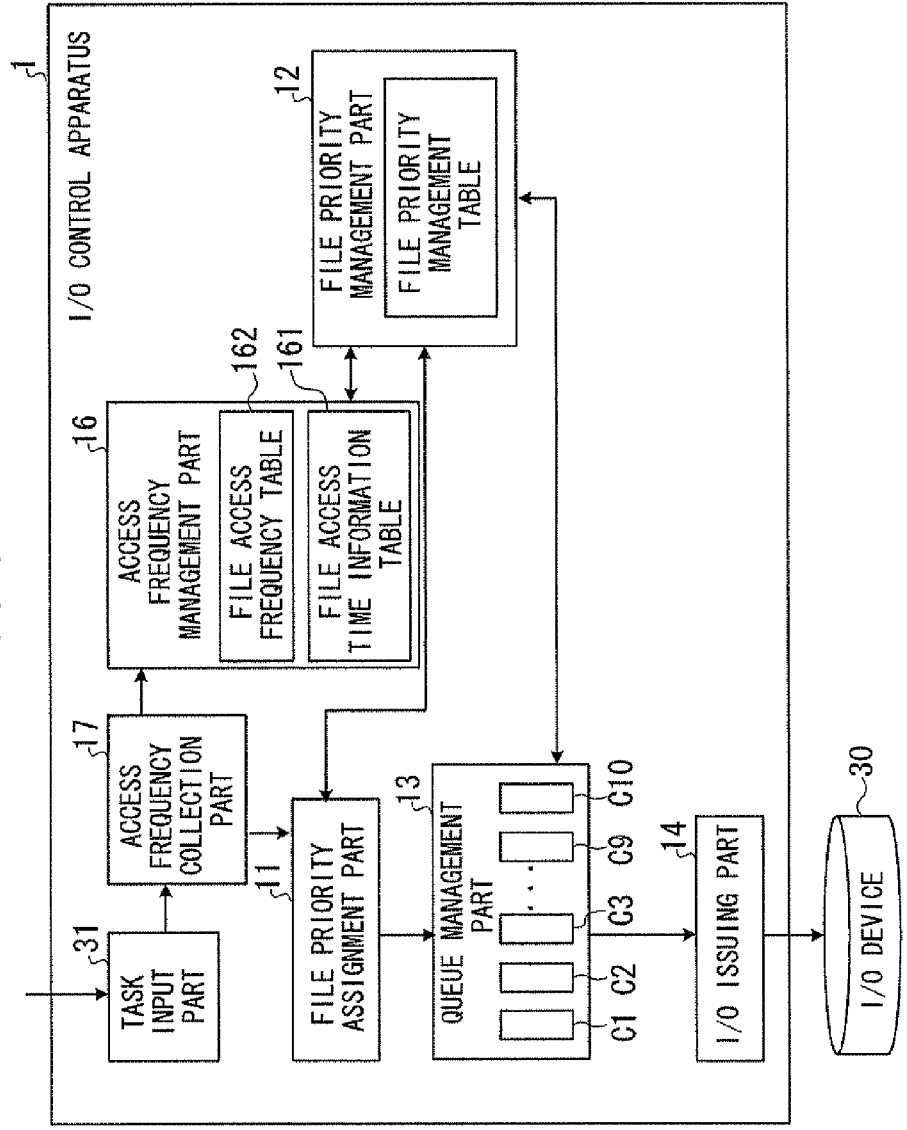
FIG. 12 is a block diagram illustrating another configuration of an I/O control apparatus.

FIG. 12 is a block diagram showing a configuration of an embodiment of an I/O control apparatus according to the present invention. Among the components in FIG. 12, components achieving similar functions as the I/O control apparatus 1 shown in FIG. 1 are given the same reference numerals, and redundant description thereabout will be omitted.

The I/O control apparatus 1 of this embodiment has an access frequency collection part 17 and an access frequency management part (file priority setting part) 16 in addition to a task input part 31, a file priority assignment part 11, a file priority management part 12, a queue management part 13, and an I/O issuing part 14. The access frequency collection part 17 is connected with the task input part 31, and the access frequency management part 16 is connected with the access frequency collection part 17 and the file priority management part 12. Similar to the I/O control apparatus 1 in the previously discussed embodiment, the file priority management part 12 is connected with the queue management part 13.

When receiving an access request, such as an I/O request, from a task via the task input part 31, the access frequency collection part 17 sends a filename to be accessed to the access frequency management part 16 and sends the i/o request from the task to the file priority assignment part 11.

The access frequency management part 16 includes a file access time information table 161 storing an access time for each file and a file access frequency table 162 storing a frequency of access of each file (such as a number of accesses per a predetermined time and a total number of accesses which have been made) for each file.

When receiving the filename to be accessed, from the access frequency collection part 17, the access frequency management part 16 records the time of accessing the file to the file access time information table 161. The access frequency management part 16 calculates an access frequency for each file periodically (at a predetermined timing) using the file access time information table 161 and stores a result calculated in the file access frequency table 162. The access frequency management part 16 obtains each file priority according to each access frequency of each file, from the file priority management part 12, and sets a new file priority on the basis of the obtained file priority and the calculated access frequency. The access frequency management part 16 causes the file priority management part 12 to register (update with) the set new file priority.

Figure 13:
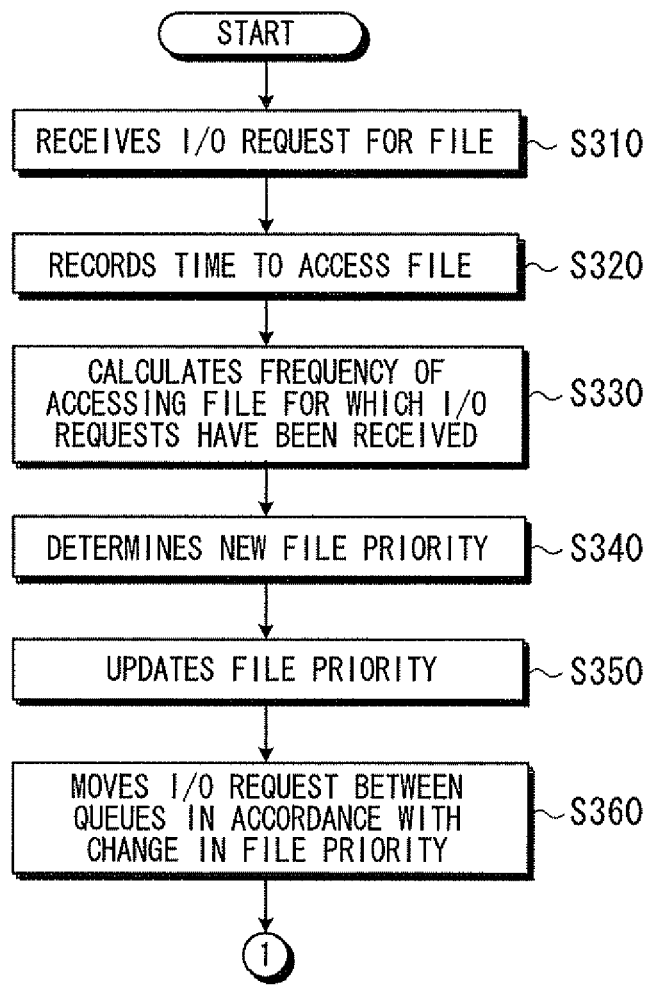
FIG. 13 is an operation flow illustrating an operation procedure of an I/O control apparatus.

Next, a operation procedure of an I/O control apparatus 1 according to an embodiment will be described. FIG. 13 is an operation flow showing the operation procedure of the I/O control apparatus according to this embodiment. When an I/O request for a file is issued from a task, the I/O control apparatus 1 receives the I/O request from the task input part 31 (operation S310).

The task input part 31 sends the received I/O request to the access frequency collection part 17. The access frequency collection part 17 sends a filename corresponding to the I/O request from the task input part 31, to both the file priority assignment part 11 and the access frequency management part 16.

When receiving the filename to be accessed, from the access frequency collection part 17, the access frequency management part 16 records a time of accessing the file to the file access time information table 161 (operation S320).

Similar to the processings of the operations S120 and S130 discussed above, the file priority assignment part 11 assigns the received I/O request to any of the queues C1 to C10 using the file priority of the file accessed by the received I/O request.

The access frequency management part 16 calculates the access frequency of each file at a predetermined timing (for example, every one minute) using the file access time information table 161 (operation S330), and stores the calculated result in the file access frequency table 162. The access frequency management part 16 obtains the file priority corresponding to each file from the file priority management table 120 of the file priority management part 12. Then, the access frequency management part 16 determines new file priorities of the files using the file priorities obtained from both the file priority management table 120 and the calculated access frequencies (operation S340).

When there is a difference between a file priority obtained from the file priority management table 120 and a determined access frequency, the access frequency management part 16 causes the file priority management part 12 to update the file priorities (operation S350).

When having updated the file priority in the file priority management table 120, the file priority management part 12 instructs the queue management part 13 to move I/O requests related to the files for which the file priorities have been updated, to different queues corresponding to the changed file priorities.

The queue management part 13 changes the queue in which the I/O requests are to be stored on the basis of the instruction from the file priority management part 12. The queue management part 13 here moves (adjusts) the I/O requests targeted by the change among queues according to the changed file priorities (operation S360). The queue management part 13 moves the I/O requests targeted by the change, for example, from the queue C1 to the queue C2.

After that, the processing of operation S140 shown in FIG. 4 is executed. That is, the I/O requests stored in the queues C1 to C10 in the queue management part 13 are sequentially taken out (retrieved), beginning with a queue with the highest processing priority, and I/O processing of files corresponding to the I/O requests is performed by the I/O device 30.

Next, description will be made on a detailed processing procedure for the I/O access control by the I/O control apparatus 1 according to an embodiment. FIGS. 14 to 17 are diagrams for illustrating the processing procedure for the I/O access control by the I/O control apparatus according to this embodiment.

Here, description will be made on the case where, in a multi-processor system, one I/O request x1 for a file X and one I/O request y1 for a file Y are stored in the queue C1 with the file priority 1, and, in such a state, an I/O request y2 for the file Y is issued from a task C, and the frequency of accessing the file Y is increased.

Figure 14:
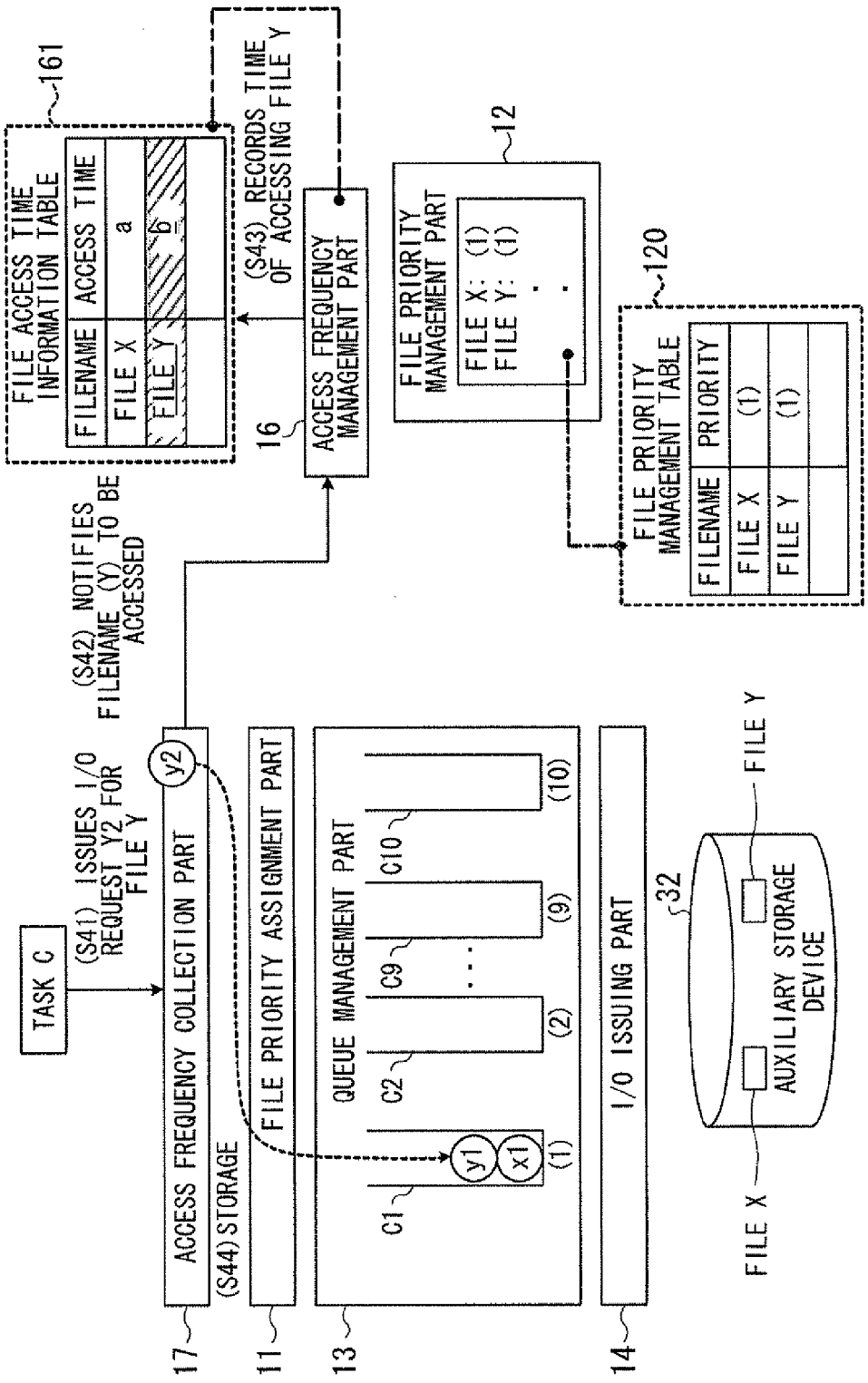
FIG. 14 is a diagram illustrating a processing procedure for an I/O access control of an I/O control apparatus of an embodiment.

As shown in FIG. 14, when the task C issues the I/O request y2 for the file Y, the access frequency collection part 17 receives the I/O request y2 (operation S41). The access frequency collection part 17 sends a filename Y of the file corresponding to the I/O request y2 (the file to be accessed) to the access frequency management part 16 (operation S42).

When receiving the filename Y of the file to be accessed, from the access frequency collection part 17 the access frequency management part 16 records the time of accessing the file Y to the file access time information table 161 (operation S43).

After that, the access frequency collection part 17 sends the I/O request y2 to the file priority assignment part 11. The I/O request y2 is stored into any of the queues C1 to C10 by a processing similar to the above-described embodiment. Since the file priority of the I/O request y2 is 1 here, the I/O request y2 is stored into the queue C1 (operation S44).

Figure 15:
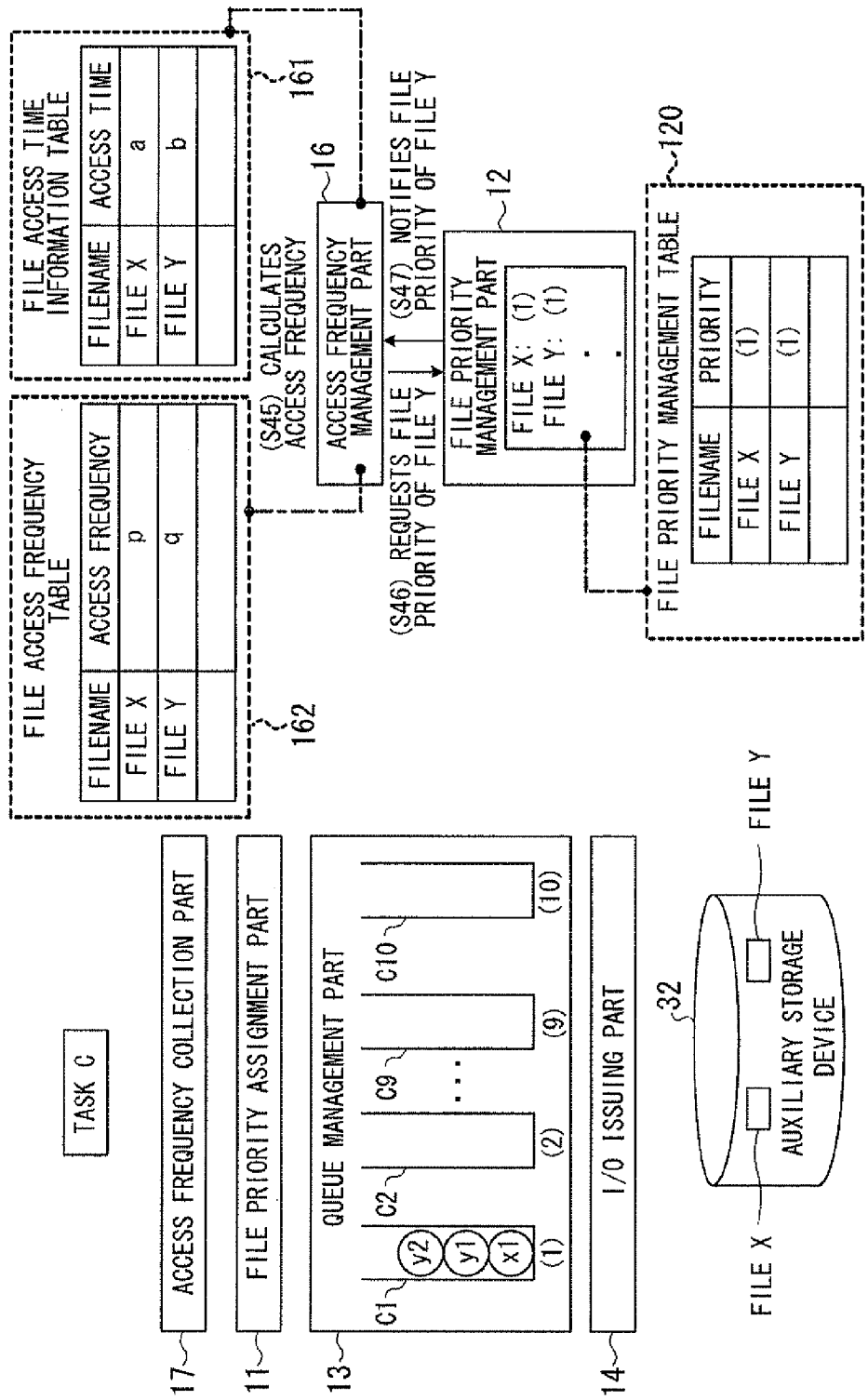
FIG. 15 is a diagram illustrating a processing procedure for an I/O access control of an I/O control apparatus of an embodiment.

Next, as shown in FIG. 15, the access frequency management part 16 calculates an access frequency of each file at a predetermined timing using the file access time information table 161 and stores the calculated access frequency in the file access frequency table 162 (operation S45). Then, the access frequency management part 16 requests a file priority corresponding to the file Y to be accessed, from the file priority management part 12 (operation S46). The file priority management part 12 extracts the file priority of the file Y requested by the access frequency management part 16, from the file priority management table 120. The file priority management part 12 notifies the extracted file priority of the file Y to the access frequency management part 16 (operation S47).

Figure 16:
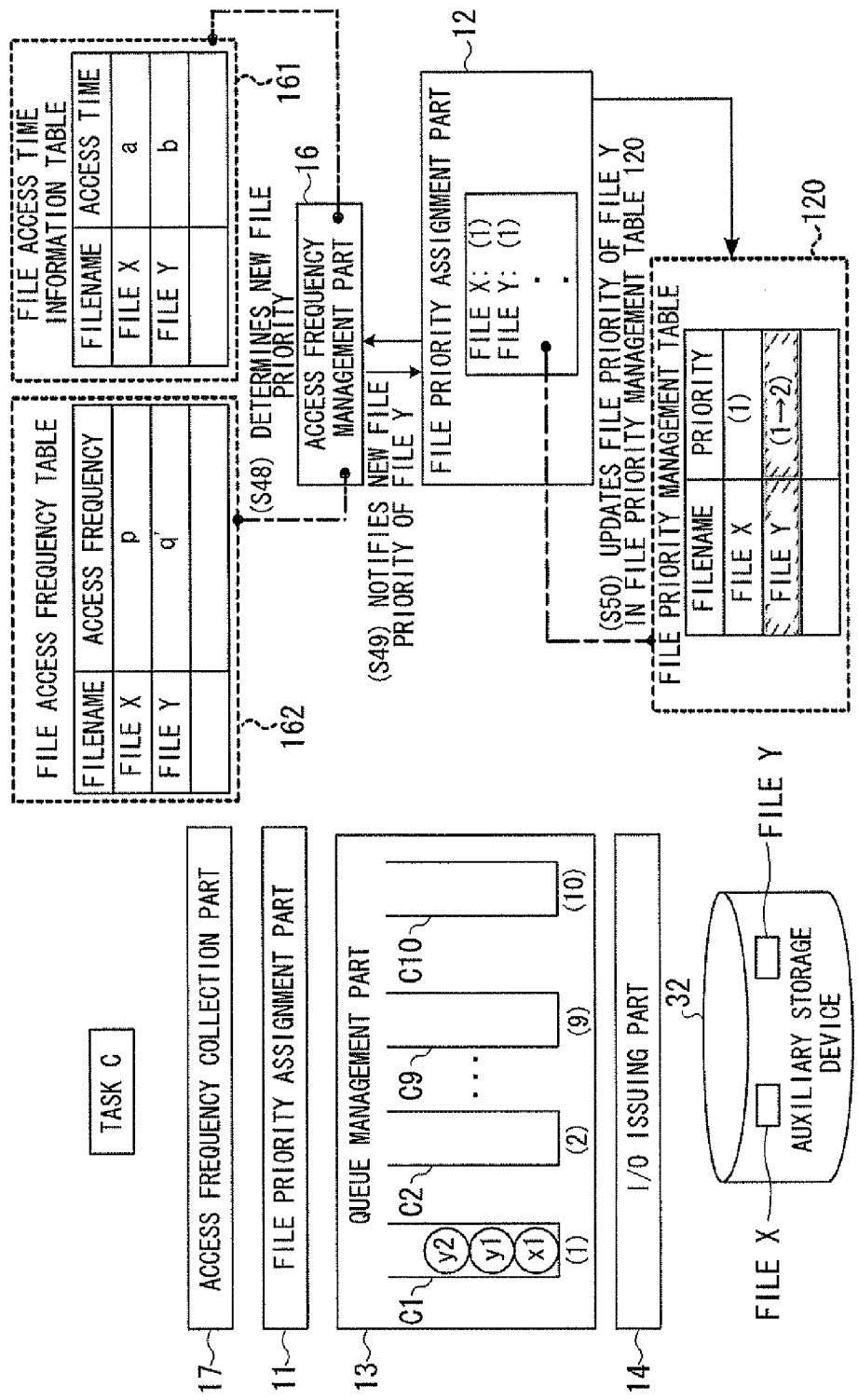
FIG. 16 is a diagram illustrating a processing procedure for an I/O access control of an I/O control apparatus of an embodiment.

Then, as shown in FIG. 16, the access frequency management part 16 determines a new file priority of each file (operation S48). Specifically, for example, a access frequency management part 16 adds one to the current file priority of a file which has been accessed with a frequency higher than a threshold set in advance. As for a file which has been accessed with a frequency lower than the threshold set in advance, the access frequency management part 16 subtracts one from the current file priority. Thus, the access frequency management part 16 sets a new file priority for a file to be accessed by increasing or decreasing the file priority at a predetermined timing. Here, description will be made on a case where the frequency of accessing the file Y is increased to be higher than the threshold by the I/O request y2 to the file Y.

When the frequency of accessing the file Y is increased to be higher than the threshold by the I/O request y2, the access frequency management part 16 adds one to the file priority (the current file priority) of the file Y notified from the file priority management part 12. Since the current file priority of the file Y is 1 here, the access frequency management part 16 determines a new file priority as 2.

When there is a difference between the newly determined file priority and the current file priority notified from the file priority management part 12, the access frequency management part 16 notifies the new file priority to the file priority management part 12 (operation S49). Thereby, the file priority management part 12 updates the file priority of the file Y in the file priority management table 120 to the new file priority (operation S50).

Figure 17:
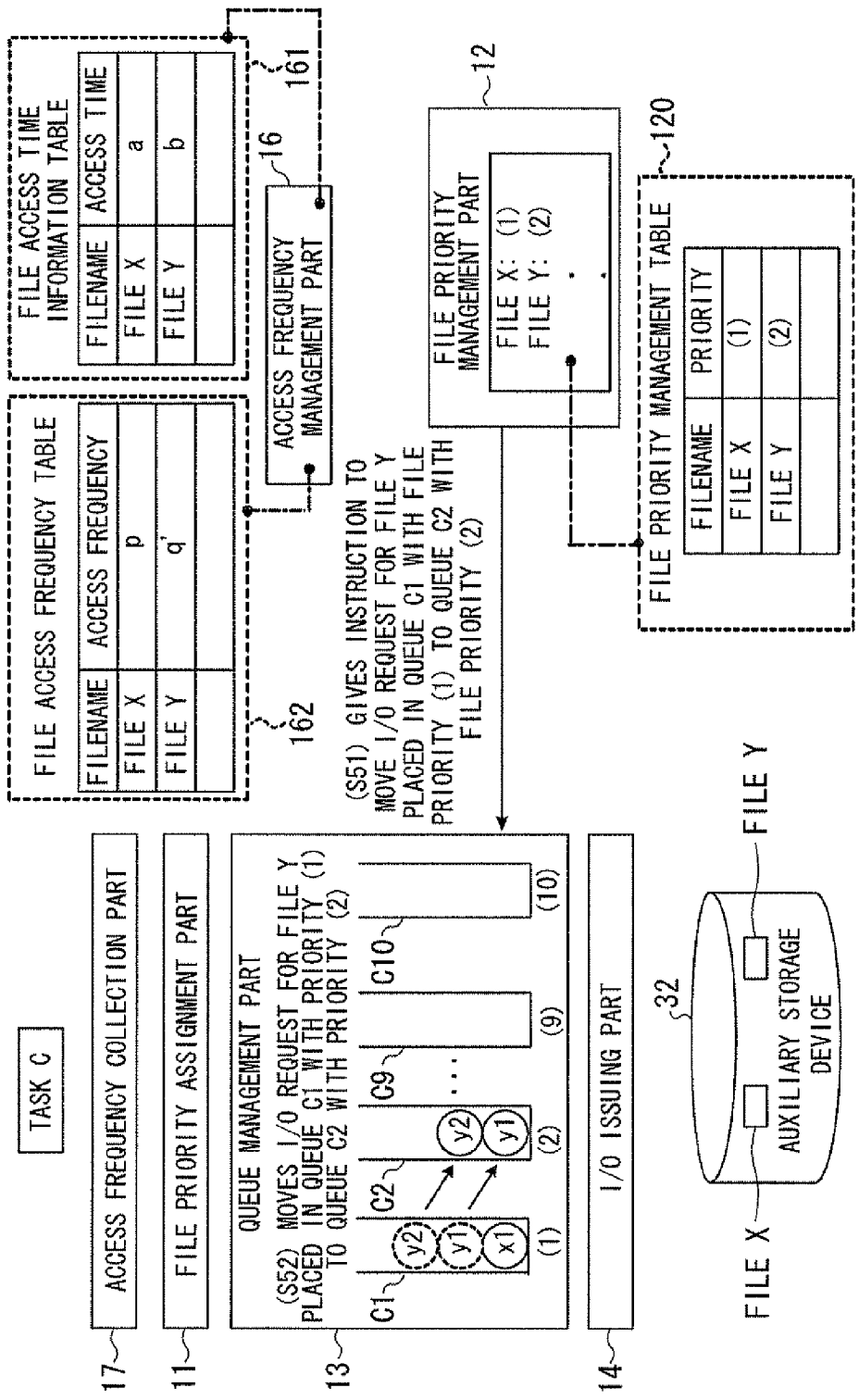
FIG. 17 is a diagram illustrating a processing procedure for an I/O access control an I/O control apparatus of an embodiment.

Next, as shown in FIG. 17, the file priority management part 12 instructs the queue management part 13 to move (adjust) I/O requests related to the file for which the file priority has been updated, between queues. Here, when the file priority management part 12 updates a file priority in the file priority management table 120, the file priority management part 12 instructs the queue management part 13 to move I/O requests between queues. Specifically, the file priority management part 12 instructs the queue management part 13 to move I/O requests for the file Y which are stored in the queue C1 with the file priority 1, to the queue C2 with the file priority 2 (operation S51).

When receiving the instruction to move the I/O requests for the file Y, from the file priority management part 12, the queue management part 13 stops accepting I/O requests from the file priority assignment part 11 and sending I/O requests to the I/O issuing part 14. Then, the queue management part 13 searches for I/O requests elated to the file Y which are stored in the queue C1 with the file priority 1, and moves the I/O requests y1 and y2 found by a search to the queue C2 with the file priority 2 (operation S52).

After that, the queue management part 13 resumes accepting I/O requests from the file priority assignment part 11 and sending I/O requests to the I/O issuing part 14. Thus, it is possible to efficiently perform processing of I/O requests for files using the file priorities corresponding to file access frequencies. Any of both the processing of S42 or S43 and the processing of S44 described with reference to FIG. 14 may be performed prior to the other. The processing of S42 or S43 and the processing of S44 may be performed at the same time.

Though it is assumed in an embodiment that the order of processing I/O requests is controlled using file priorities calculated corresponding to file access frequencies, the order of processing I/O requests may be controlled using file priorities corresponding to frequencies of access from tasks.

Furthermore, though description has been made of a case where, when a new file priority of each file is determined, only one is added to or subtracted from the current file priority, two or more may be added to or subtracted from the current file priority.

Furthermore, though description has been made of a case where new file priorities of files are determined using file priorities obtained from the file priority management table 120 and calculated access frequencies, the new file priorities of the files may be determined using only the calculated access frequencies.

As described above, in an embodiment, since a file priority is dynamically changed on the basis of a frequency of accessing a file, it is possible to efficiently process I/O requests for files using file priorities corresponding to file access frequencies.

Furthermore, since the file priority management part 12 sets file priorities using the file priorities in the file priority management table 120 to files, it is possible to easily and appropriately set file priorities.

Next, another embodiment of the present invention will be described with the use of FIGS. 18 to 21. In this embodiment, file priorities are set according to task priorities of tasks of creating a file, and an order of processing I/O requests is controlled using the set file priorities.

Figure 18:
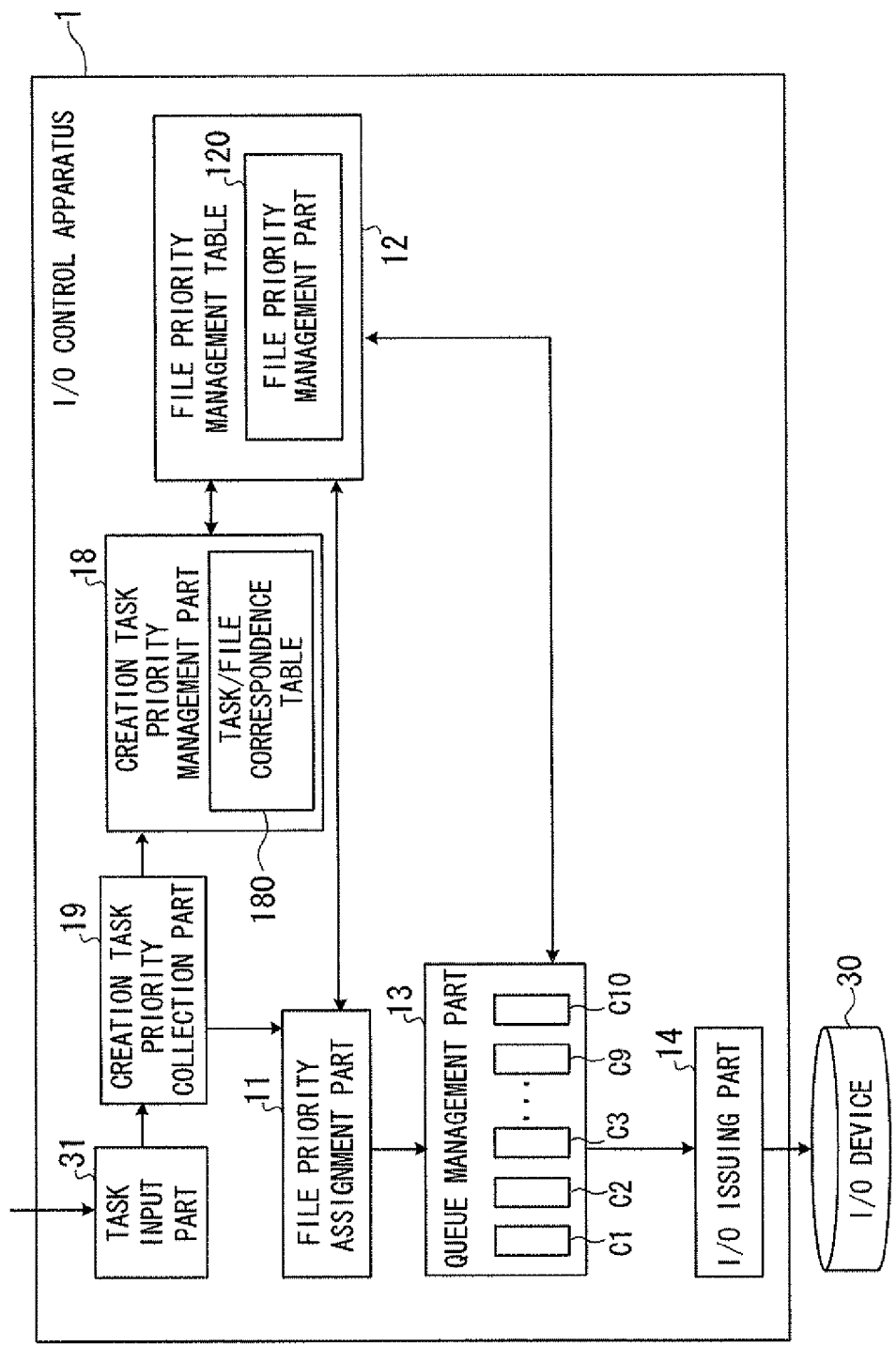
FIG. 18 is a block diagram illustrating another configuration of an I/O control apparatus.

FIG. 18 is a block diagram showing a configuration of an embodiment of the I/O control apparatus according to the present invention. Among the components in FIG. 18, components achieving similar functions as the I/O control apparatus 1 shown in FIG. 1 are given the same reference numerals, and redundant description thereabout will be omitted.

The I/O control apparatus 1 of this embodiment has a creation task priority collection part 19 and a creation task priority management part 18 in addition to a task input part 31, a file priority assignment part 11, a file priority management part 12, a queue management part 13, and an I/O issuing part 14. The creation task priority collection part 19 is connected with the task input part 31, and the creation task priority management part 18 is connected with the creation task priority collection part 19 and the file priority management part 12 Similarly to the I/O control apparatus 1 of previously discussed embodiments, the file priority management part 12 is connected with the queue management part 13.

When receiving an access request, such as a file creation request, from a task via the task input part 31, the creation task priority collection part 19 sends the filename to be accessed and the task priority (information about a processing priority of the task which has sent the file creation request) to the creation task priority management part 18.

The creation task priority management part 18 includes a task/file correspondence table (task information) 180 in which a correspondence relationship between task priorities and file priorities is stored. When the file priority of a file corresponding to an I/O request is not registered with the file priority management table 120, the creation task priority management part 18 determines the file priority of the file to be created, with the use of the task/file correspondence table 180. A task priority may be assigned by a user or may be set as determined by the access control apparatus.

Figure 19:
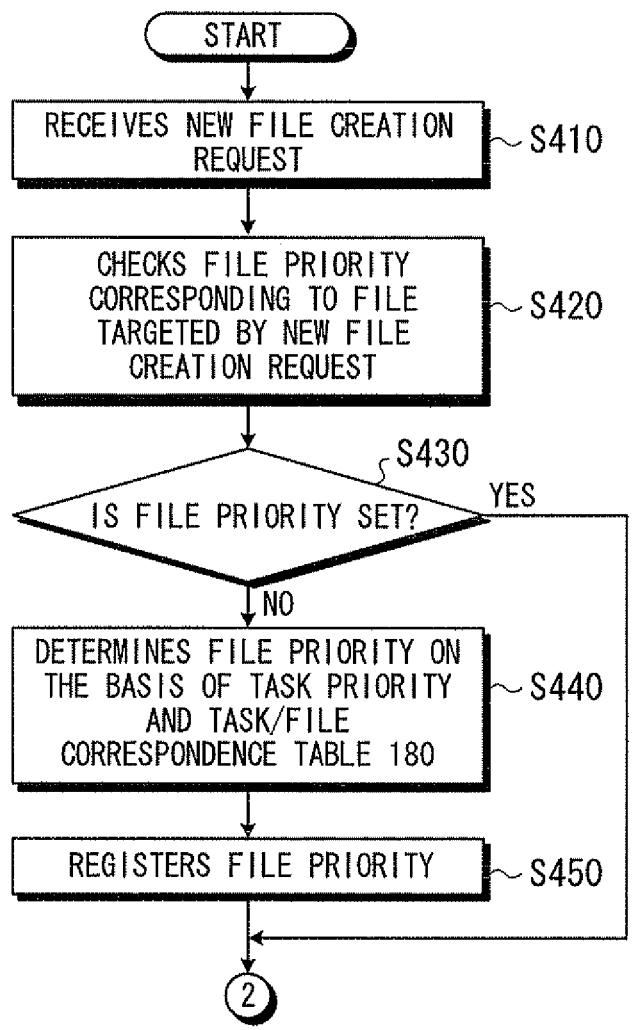
FIG. 19 is an operation flow illustrating an operation procedure of an I/O control apparatus.

Next, a operation procedure of the I/O control apparatus 1 according to an embodiment is described. FIG. 19 is an operation flow showing the operation procedure of the I/O control apparatus according to this embodiment. When a request to newly create a file (a file creation request) is issued from a task, the I/O control apparatus 1 receives this file creation request by the task input part 31 (operation S410).

The task input part 31 sends the received file creation request to the creation task priority collection part 19. The creation task priority collection part 19 sends a filename and a task priority corresponding to the file creation request from the task input part 31, to the creation task priority management part 18.

The creation task priority management part 18 obtains the file priority of the file to be created, from the file priority management part 12 and checks the file priority (operation S420). If the file priority is not set for the file to be created (operation S430: No), the creation task priority management part 18 determines the file priority of the file to be created with the use of the task/file correspondence table 180. The creation task priority management part 18 here determines the file priority of the file to be created by extracting a file priority corresponding to the task priority sent from the creation task priority collection part 19, from the task/file correspondence table 180 (operation S440).

Then, the creation task priority management part 18 causes the determined file priority to be registered with the file priority management table 120 of the file priority management part 12 (operation S450). After that, the file priority management part 12 notifies the file priority registered with the file priority management table 120 to the file priority assignment part 11.

On the other hand, when a file priority is set for the file to be created (operation S430: Yes), the file creation request is stored in a predetermined queue using the set file priority without requiring a task priority to be set.

After that, similar to the processing of the operations S130 and S140 shown in FIG. 4, the file priority assignment part 11 hands both the file priority and the file creation request from the file priority management part 12, over to the queue management part 13. The queue management part 13 stores the file creation request received from the file priority assignment part 11 into a queue corresponding to the file priority received from the file priority assignment part 11. Then, the I/O issuing part 14 sequentially takes out (retrieves) I/O requests stored in the queues C1 to C10 in the queue management part 13, beginning with a queue with the highest processing priority, and sends them to the I/O device 30. The I/O device 30 performs I/O processing of files corresponding to the I/O requests.

Figure 20:
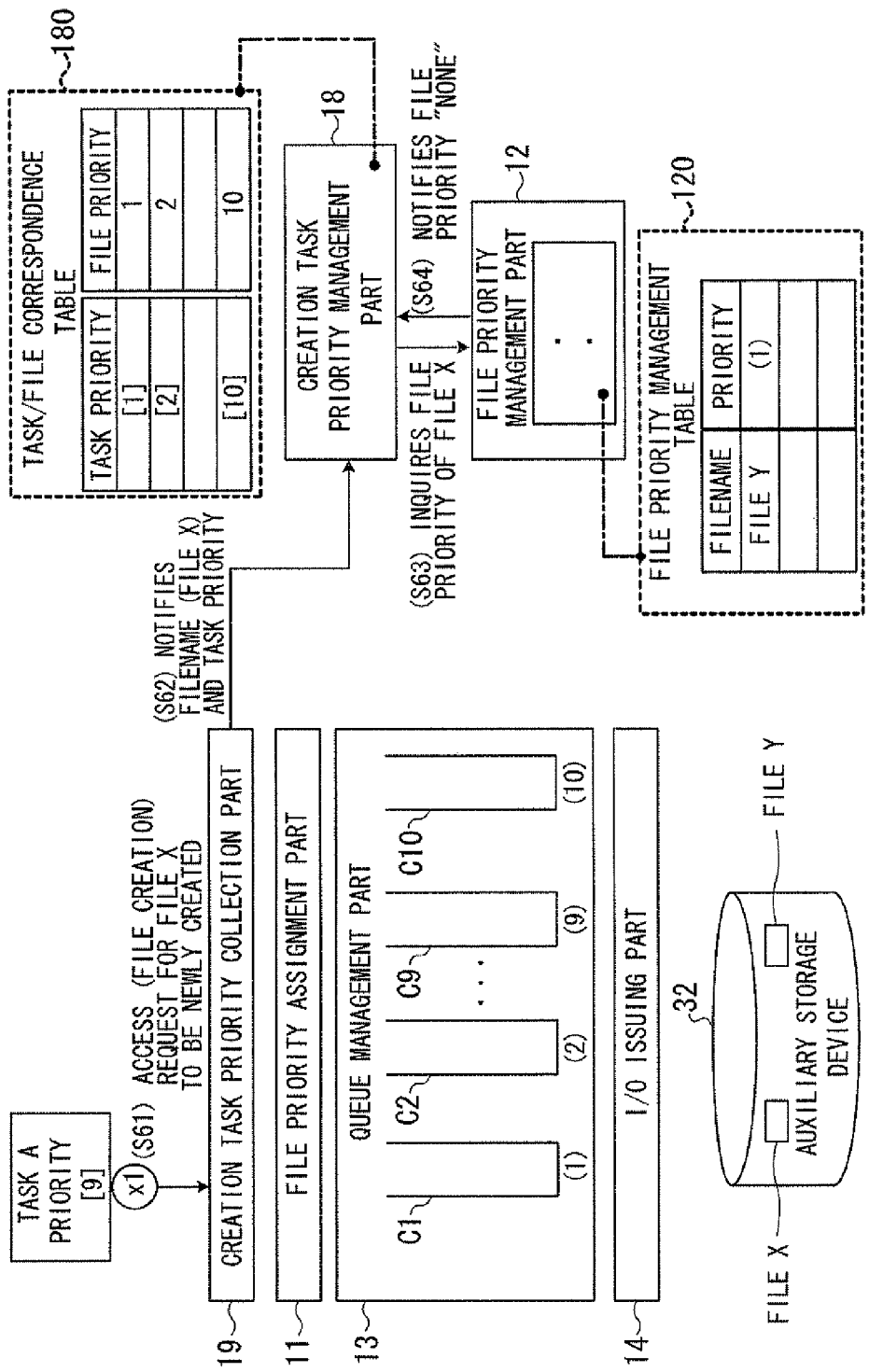
FIG. 20 is a diagram illustrating a processing procedure for an I/O access control of an I/O control apparatus of an embodiment.
Figure 21:
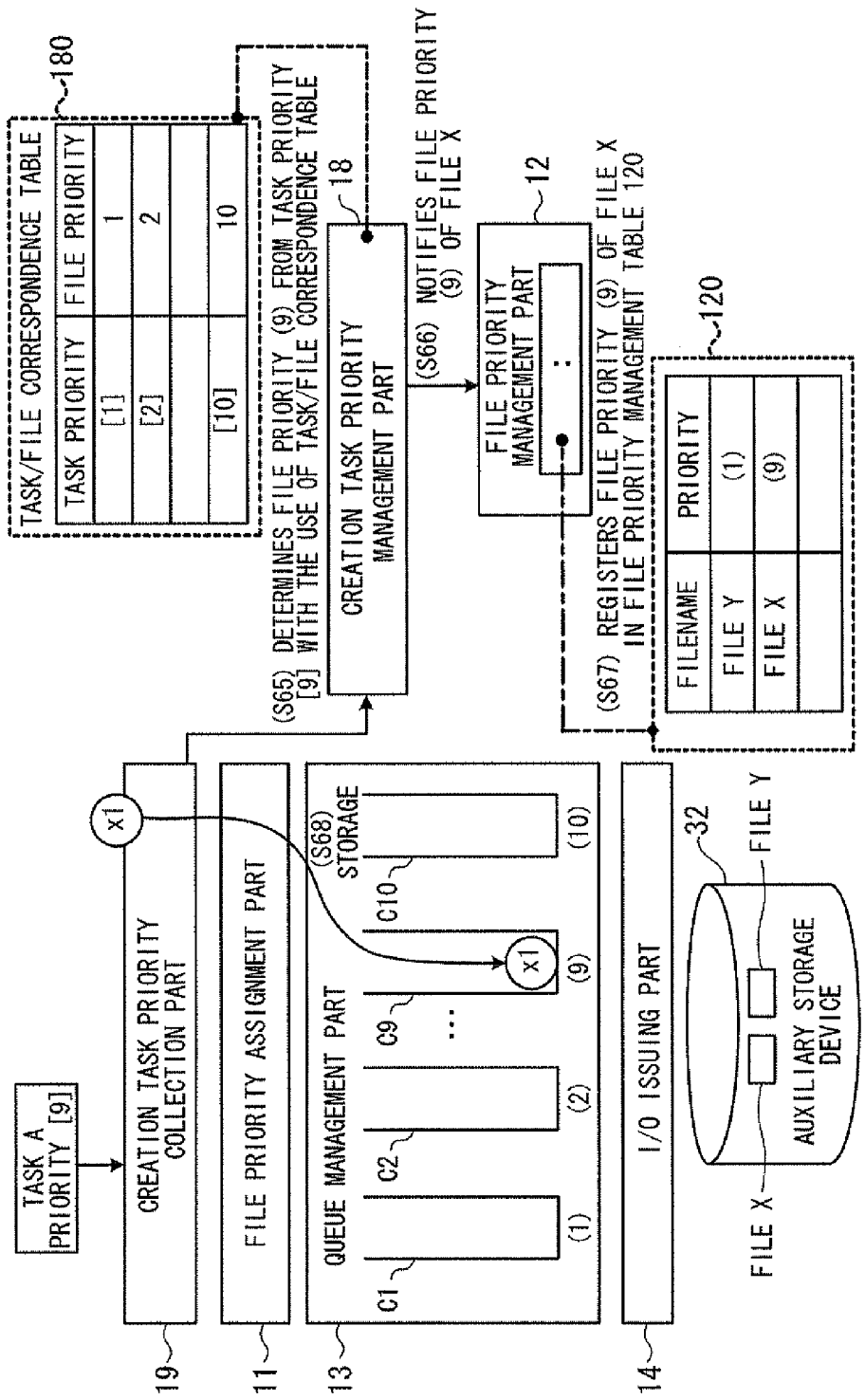
FIG. 21 is a diagram illustrating a processing procedure for an I/O access control of an I/O control apparatus of an embodiment.

Next, description will be made on a detailed processing procedure for the I/O access control by the I/O control apparatus 1 according to this embodiment. FIGS. 20 and 21 are diagrams for illustrating processing procedure(s) for the I/O access control by the I/O control apparatus according to this embodiment. Here, description will be made on a case where, in a multi-processor system, the task priority of a task A is 9 and a file to be newly created by the task A is a file X.

As shown in FIG. 20, when the task A issues a request to newly create the file X (a file creation request x1), the creation task priority collection part 19 receives the file creation request x1 (operation S61). The creation task priority collection part 19 notifies the filename "X" of the file X corresponding to the file creation request x1 to the creation task priority management part 18 (operation S62).

The creation task priority management part 18 inquires of the file priority management part 12 about the file priority of the file X to be created (operation S63). The file priority management part 12 extracts the file priority of the file X requested by the creation task priority management part 18, from the file priority management table 120. The file priority management part 12 notifies the extracted file priority of the file X to the access frequency management part 16.

If the file priority management part 12 cannot extract the file priority of the file X requested by the creation task priority management part 18, from the file priority management table 120 (in the case where the file priority of the file X is not registered), the file priority management part 12 notifies the access frequency management part 16 that the file priority of the file X does not exist (file priority "none") (operation S64). Since the file X is a file to be newly created by the task A here, the file priority management part 12 notifies the access frequency management part 16 that the file priority of the file X does not exist.

Next, if the file priority of the file X is not registered, the creation task priority management part 18 determines the file priority of the file X (a file to be newly created) with the use of the task/file correspondence table 180, as shown in FIG. 21. The creation task priority management part 18 extracts the file priority of the file X from the task/file correspondence table 180 on the basis of the task priority 9 of the file X.

In the task/file correspondence table 180, a task priority and a file priority are associated with each other so that, for example, ten-stage task priorities for tasks directly become file priorities. In this case, the task priority 9 of the task A corresponds to the file priority 9 of the file X. Therefore, the creation task priority management part 18 here determines the file priority of the file X as 9 (operation S65 in FIG. 21).

The creation task priority management part 18 notifies the determined file priority 9 of the file X to the file priority management part 12 (operation S66). The file priority management part 12 registers the file priority 9 of the file X handed over by the creation task priority management part 18 with the file priority management table 120 (operation S67). Thereby, the file priority management part 12 requests to newly register the file to be created and the file priority with the file priority management table 120.

After that, the creation task priority collection part 19 sends the file creation request x1 to the file priority assignment part 11. The file priority management part 12 sends the file priority 9 of the file X to the file priority assignment part 11. Then, the file priority assignment part 11 hands both the file creation request x1 for the file X and the file priority 9 of the file X over to the queue management part 13. The queue management part 13 stores the file creation request x1 received from the file priority assignment part 11 in the queue C9 corresponding to the file priority 9 received from the file priority assignment part 11 (operation S68).

Thus, the I/O control apparatus is enabled to set a file priority corresponding to a task priority of a task which is going (requesting) to create a file, and efficiently perform processing of I/O requests for files using the set file priorities. The task priority of each task may be sent to the creation task priority collection part 19 from each task, or may be stored for each task by the creation task priority collection part 19 in advance. Among the processing(s) of S68, the processing for sending the file creation request x1 from the creation task priority collection part 19 to the file priority assignment part 11 may be performed prior to S62 to S67 or performed simultaneously with the processings of S62 to S67.

As described above, since a file priority is dynamically changed using the task priority of a file, it is possible to efficiently process I/O requests for files using file priorities corresponding to the task priorities of generation source tasks.

Furthermore, since the task/file correspondence table 180 is stored in advance, it is possible to easily obtain a file priority corresponding to a task priority by referring to the task/file correspondence table 180 even if, when a request to newly create a file is received from a task, the file priority of the file does not exist. Thereby, it is possible to easily perform processing of I/O requests for files on the basis of file priorities corresponding to task priorities.

Next, another embodiment of the present invention will be described with the use of FIGS. 22 to 29. In this fifth embodiment, when multiple tasks with different task priorities access the same file, new file priorities (current priorities) are set, and an order of processing the I/O requests is controlled using these new file priorities.

Figure 22:
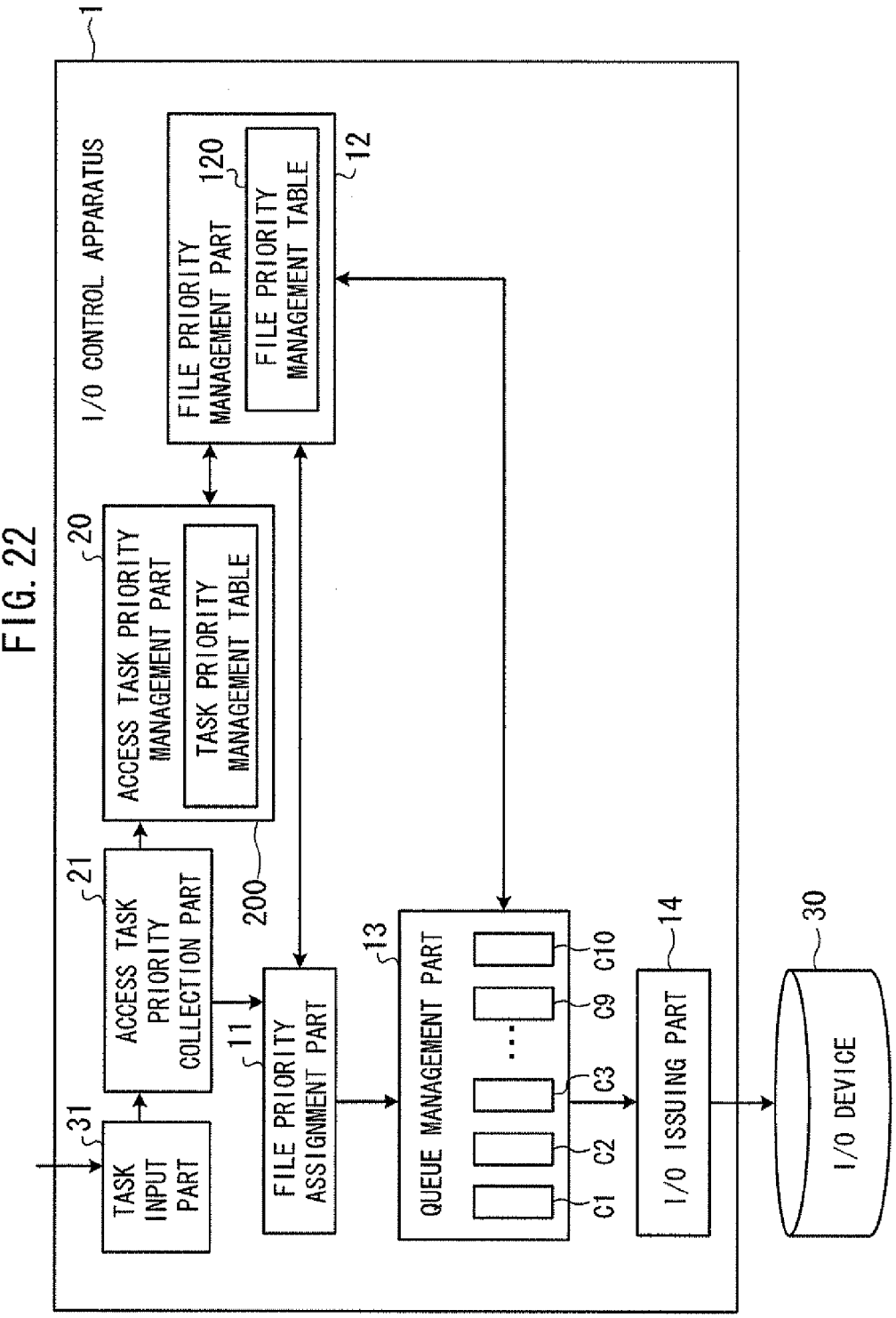
FIG. 22 is a block diagram illustrating another configuration of an I/O control apparatus.

FIG. 22 is a block diagram showing a configuration of an embodiment of the I/O control apparatus according to the present invention. Among the components in FIG. 22, components achieving similar functions as the I/O control apparatus 1 shown in FIG. 1 are given the same reference numerals, and redundant description thereabout will be omitted.

The I/O control apparatus 1 of this embodiment includes an access task priority collection part 21 and an access task priority management part 20 in addition to a task input part 31, a file priority assignment part 11, a file priority management part 12, a queue management part 13 and an I/O issuing part 14. The access task priority collection part 21 is connected with the task input part 31, and the access task priority management part 20 is connected with the access task priority collection part 21 and the file priority management part 12. The file priority management part 12 is connected with the queue management part 13.

When receiving an access request (I/O request) for a file from a task via the task input part 31, the access task priority collection part 21 sends the I/O request to the access task priority management part 20.

The access task priority management part 20 includes a task priority management table (task information) 200 as an information table about a task priority of each task. The access task priority management part 20 provides the task priority of each task for the file priority management part 12 by referring to the task priority management table 200 For example, when the access task priority collection part 21 receives an I/O request from a task, the access task priority management part 20 receives a task priority corresponding to the I/O request, from the access task priority collection part 21, and creates the task priority management table 200.

The file priority management part 12 in this embodiment stores a file priority management table 121. This file priority management table 121 is an information table in which a file priority and a current priority (a current processing priority which is dynamically set with the use of a task priority and a file priority) are associated with each other for each kind of file.

Furthermore, the file priority management part 12 in this embodiment sets new file priorities (current priorities) using task priorities, file priorities and current priorities. Then, I/O requests are stored into predetermined queues C1 to C10 according to the newly set current priorities.

Figure 23:
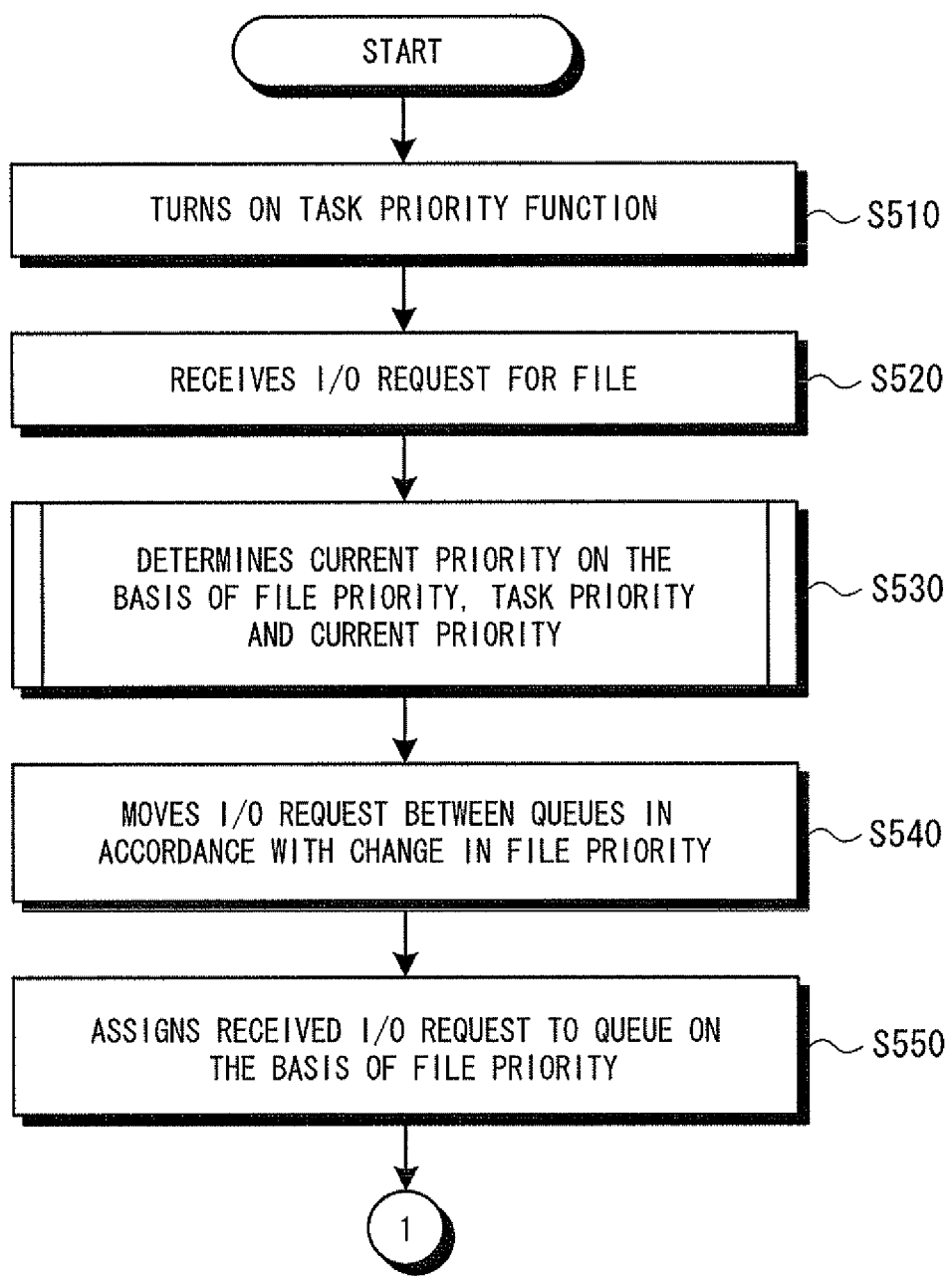
FIG. 23 is an operation flow illustrating another operation procedure of an I/O control apparatus.

Next, an operation procedure of the I/O control apparatus 1 according to an embodiment will be described. FIG. 23 is an operation flow showing the operation procedure of the I/O control apparatus according to this embodiment. First, a task priority function is turned on (operation S510). This task priority function is a function to set new file priorities for the I/O requests when multiple tasks with different task priorities access the same file (I/O requests). In other words, when the processing priorities of tasks are different, it is possible to set which task priority should be assigned to which file priority if the task priority function is on.

When an I/O request for a file is issued from a task, the I/O control apparatus 1 receives the I/O request by the task input part 31 (operation S520). The task input part 31 sends the received I/O request to the access task priority collection part 21. The access task priority collection part 21 sends the I/O request from the task input part 31 to the file priority assignment part 11. The file priority assignment part 11 inquires of the file priority management part 12 about the file priority corresponding to the I/O request.

The file priority management part 12 sets a new current priority using the file priority, the task priority, and the current priority which is currently set in the file priority management table 120 (operation S530). Thereby, the current priority in the file priority management table 120 is updated The file priority management part 12 instructs the queue management part 13 to move I/O requests related to the file for which the current priority has been updated (I/O requests already stored in a queue) to another queue corresponding to the new file priority. The queue management part 13 changes the queue in which the I/O requests are to be stored on the basis of the instruction from the file priority management part 12. The queue management part 13 moves (adjusts) the I/O requests targeted by the change, between the queues in accordance with the changed file priority (operation S540). In other words, when an I/O request for a file is already stored in a queue corresponding to an old priority, the queue management part 13 moves the I/O request to a queue corresponding to a new file priority. The queue management part 13 moves the I/O request targeted by the change, for example, from the queue C1 to the queue C2.

After that, the file priority management part 12 instructs the file priority assignment part 11 to assign the I/O request which is not stored in a queue yet, to the queue corresponding to the new file priority.

The file priority assignment part 11 sends the file priority obtained from the file priority management part 12 and the I/O request from the task to the queue management part 13. The queue management part 13 causes the I/O request handed over by the file priority assignment part 11 to be stored in a queue corresponding to the file priority in the file priority assignment part 11. Thus, using the file priority corresponding to the I/O request, the file priority assignment part 11 assigns the I/O request to any of the queues C1 to C10 corresponding to the file priority (operation S550).

After that, the processing of the operation S140 shown in FIG. 4 is executed. That is, I/O requests stored in the queues C1 to C10 in the queue management part 13 are sequentially taken out, beginning with the queue with the highest processing priority, and I/O processing of files corresponding to the I/O requests is performed by the I/O device 30.

Next, description will be made on a detailed processing procedure for the I/O access control by the I/O control apparatus 1 according to an embodiment. FIGS. 24 and 25 and FIGS. 27 to 29 are diagrams for illustrating the processing procedures for the I/O access control by the I/O control apparatus according this embodiment.

Here, description will be made on a case where a task A has already issued a predetermined number of I/O requests for a file X and a file Y (the I/O requests are already stored in any of the queues C1 to C10), and an I/O request for the file Y is issued from a task B (with the task priority 9) the task priority of which is higher than the task priority of the task A (with the task priority 1). It is assumed that the file priorities of the file X and the file Y are, for example, the lowest priority 1.

Figure 24:
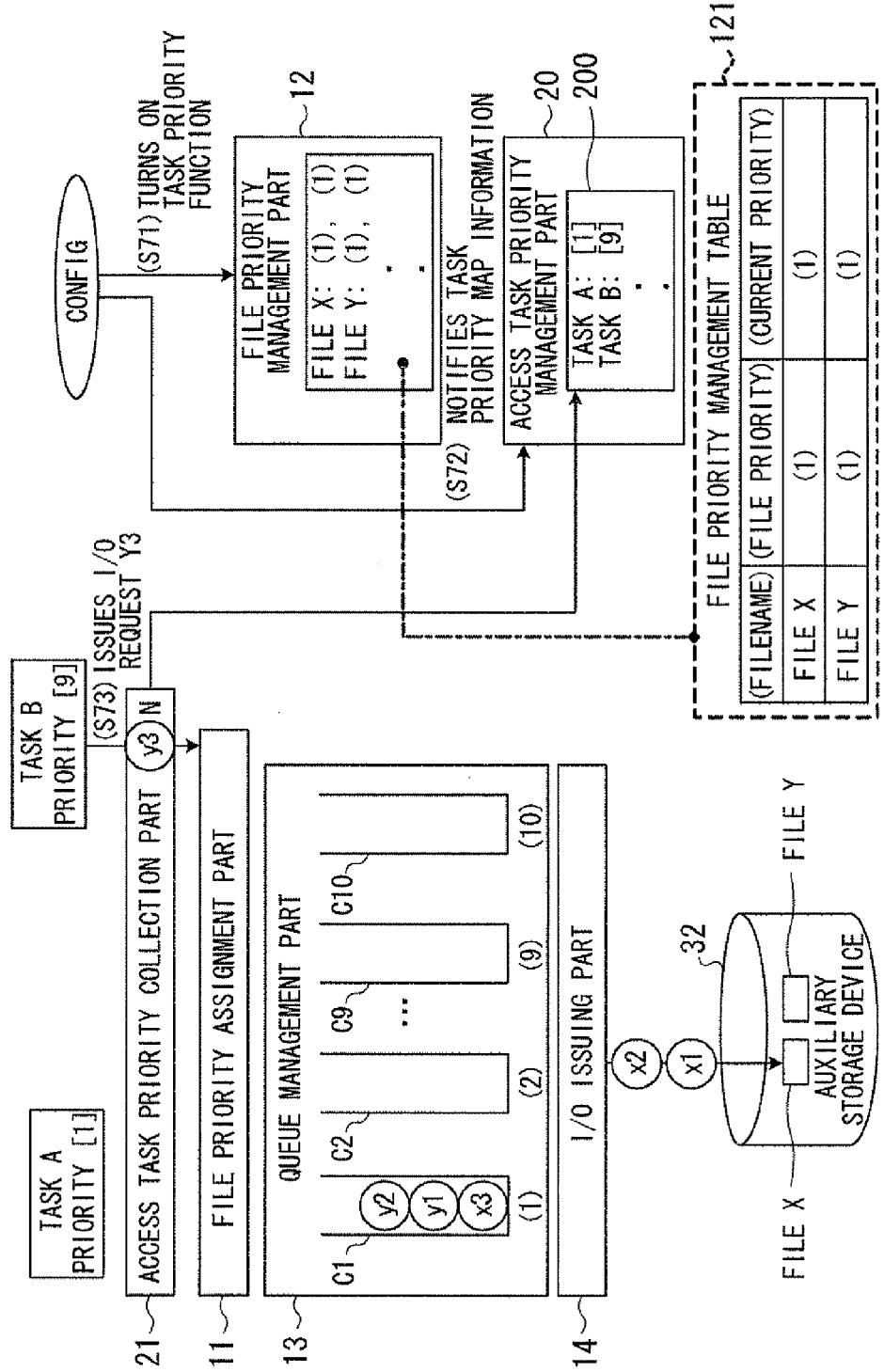
FIG. 24 is a diagram illustrating a processing procedure for an I/O access control of an I/O control apparatus of an embodiment.

As shown in FIG. 24, the task priority function of the file priority management part 12 is turned on first by an instruction (Config) from a predetermined setting means or the like (operation S71). In this case, an initial value of the task priority of each task may be set (registered) in the task priority management table 200 by Config (notifies task priority map information) (operation S72).

When an I/O request y3 for the file Y is issued from the task B in a state where the task A has already issued I/O requests x3, y1 and y2 for the file X and the file Y, the access task priority collection part 21 receives the I/O request y3 (operation S73).

The access task priority collection part 21 sends the task priority 9 of the task B which has issued the I/O request y3, to the access task priority management part 20. The access task priority management part 20 registers the task priority 9 with the task priority management table 200. Each time an I/O request is received from a task, the access task priority collection part 21 sends a task priority corresponding to the I/O request to the access task priority management part 20. Therefore, the task priority 1 of the task A is already registered with the task priority management table 200.

The access task priority collection part 21 sends the I/O request y3 to the file priority assignment part 11. Thereby, the file priority assignment part 11 receives the I/O request y3 from the access task priority collection part 21.

Figure 25:
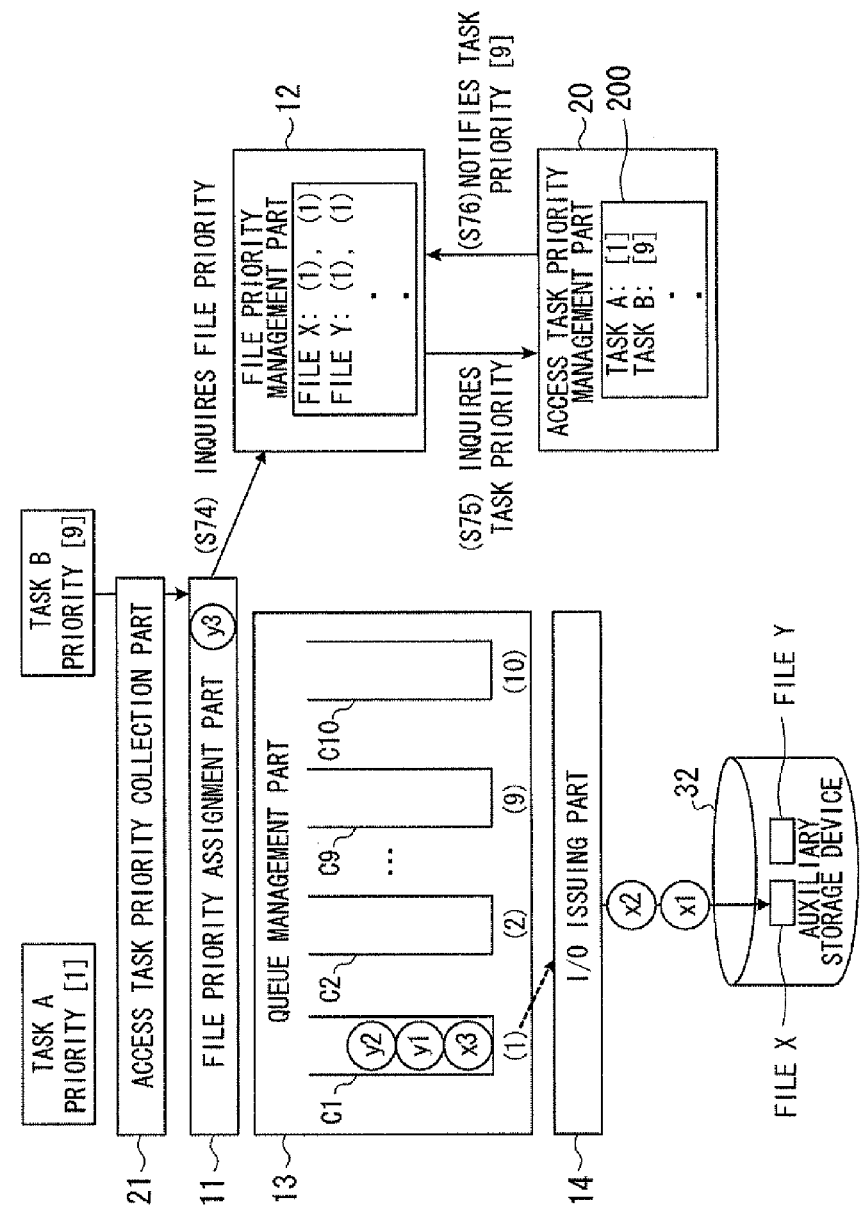
FIG. 25 is a diagram illustrating a processing procedure for an I/O access control of an I/O control apparatus of an embodiment.

Next, as shown in FIG. 25, the file priority assignment part 11 inquires of the file priority management part 12 about the file priority of the file Y (operation S74). Thereby, the file priority management part 12 receives the request for the file priority from the file priority assignment part 11.

Since the task priority function of the file priority management part 12 is enabled here, the file priority management part 12 inquires of the access task priority management part 20 about the task priority of the task B (operation S75). The access task priority management part 20 extracts the task priority 9 of the task B from the task priority management table 200 and notifies the task priority 9 to the file priority management part 12 (operation S76). Thereby, the file priority management part 12 receives the task priority 9 of the task B from the access task priority management part 20.

The file priority management part 12 compares the task priority 9 and the file priority 1 and determines the current priority as 9. Here, the current priority determination processing by the file priority management part 12 is described below in detail.

Figure 26:
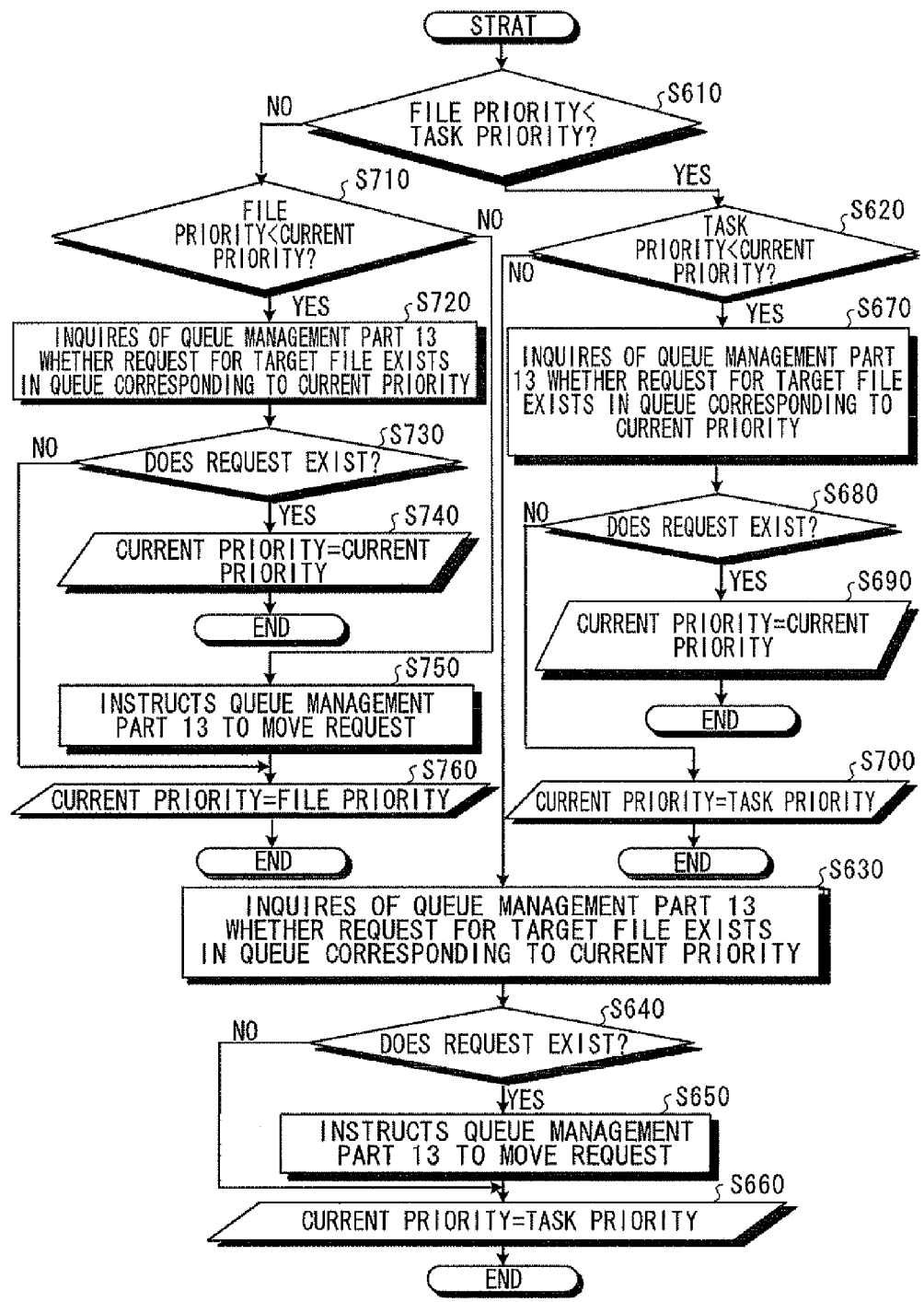
FIG. 26 is an operation flow illustrating a processing procedure for determining a current priority.

FIG. 26 is an operation flow showing the processing procedure for determining a current priority. The file priority management part 12 first compares a task priority of a task which has sent a new I/O request with a file priority of a file corresponding to this I/O request (operation S610).

If the task priority of the task which has sent the new I/O request is higher than the file priority (operation S610: Yes), the file priority management part 12 compares the task priority of the task which has sent the new I/O request with a current priority of the file corresponding to the I/O request. Specifically, the file priority management part 12 extracts the current priority of the file corresponding to the I/O request from the file priority management table 121, and compares the extracted current priority with the task priority of the task which has sent the new I/O request (operation S620).

If a value of the task priority is equal to or larger than a value of the current priority (operation S620: No), the file priority management part 12 inquires of the queue management part 13 about whether an I/O request for the same file that is to be accessed is stored in the queue corresponding to the current priority (operation S630).

If an I/O request for the file to be accessed is stored in the queue corresponding to the current priority (operation S640: Yes), the file priority management part 12 instructs the queue management part 13 to move the I/O request.

On the basis of the instruction from the file priority management part 12, the queue management part 13 changes the queue in which the I/O request is to be stored. The queue management part 13 moves an I/O request for the same file that is to be accessed, which is stored in the queue corresponding to the current priority, to a queue corresponding to the task priority (operation S650). Then, the file priority management part 12 sets the current priority in the file priority management table 121 to the same priority as the task priority (current priority=task priority) (operation S660).

On the other hand, if I/O requests for the file to be accessed are not stored in the queue corresponding to the current priority (operation S640: No), the file priority management part 12 sets the current priority in the file priority management table 121 to the same priority as the task priority (current priority=task priority) (operation S660).

If the value of the task priority is smaller than the value of the current priority (operation S620: Yes), the file priority management part 12 inquires of the queue management part 13 about whether an I/O request for the same (target) file that is to be accessed is stored in the queue corresponding to the current priority (operation S670).

If an I/O request for the file to be accessed is stored in the queue corresponding to the current priority (operation S680: Yes), the file priority management part 12 causes the current priority in the file priority management table 121 to be kept as is (current priority=current priority) (operation S690).

On the other hand, if an I/O request for the file to be accessed is not stored in the queue corresponding to the current priority (operation S680: No), the file priority management part 12 sets the current priority in the file priority management table 121 to the same priority as the task priority (current priority-task priority) (operation S700).

If the task priority of the task which has sent the new I/O request is equal to or lower than the file priority (operation S610: No), the file priority management part 12 compares the file priority of the file corresponding to the I/O request with the current priority of the file corresponding to the I/O request. Specifically, the file priority management part 12 extracts the current priority and the file priority of the file corresponding to the I/O request from the file priority management table 121 and compares these priorities (operation S710).

If the value of the file priority is smaller than the value of the current priority (operation S710: Yes), the file priority management part 12 inquires of the queue management part 13 about whether an I/O request for the same (target) file that is to be accessed is stored in the queue corresponding to the current priority (operation S720).

If an I/O request for the file to be accessed is stored in the queue corresponding to the current priority (operation S730: Yes), the file priority management part 12 causes the current priority in the file priority management table 121 to be kept as it is (current priority=current priority) (operation S740).

On the other hand, if an I/O request for the file to be accessed is not stored in the queue corresponding to the current priority (operation S730: No), the file priority management part 12 sets the current priority in the file priority management table 121 to the same priority as the file priority (current priority=file priority) (operation S760).

If the value of the file priority is equal to or larger than the value of the current priority (operation S710: No), the file priority management part 12 instructs the queue management part 13 to move the I/O request. The queue management part 13 changes the queue in which the I/O request is to be stored according to the instruction from the file priority management part 12. Specifically, the queue management part 13 moves the I/O request for the same file that is to be accessed, which is stored in the queue corresponding to the current priority, to a queue corresponding to the file priority (operation S750).

Then, the file priority management part 12 sets the current priority in the file priority management table 121 to the same priority as the file priority (current priority=file priority) (operation S760).

Thus, if an I/O request for the same kind of file as a file to be accessed is stored in a queue corresponding to the current priority, the file priority management part 12 causes the I/O request to be moved to a queue corresponding to whichever is higher between the file priority and the task priority.

Furthermore, if the current priority is higher than the file priority and the task priority, and an I/O request for the file of the same kind as the file to be accessed is stored in the queue corresponding to the current priority, the file priority management part 12 keeps the current priority as is.

Furthermore, if the current priority is higher than the file priority and the task priority, and an I/O request for the same file that is to be accessed is not stored in the queue corresponding to the current priority, the file priority management part 12 sets whichever is higher between the file priority and the task priority for the current priority.

Furthermore, if the task priority is higher than the file priority and the current priority, the file priority management part 12 sets the task priority for the current priority. If the file priority is higher than the task priority and the current priority, the file priority management part 12 sets the file priority for the current priority.

In this embodiment, since the task priority of the task B is 9 and is higher than the file priority 1 of the file Y (step S610: Yes), the file priority management part 12 compares the task priority 9 of the task B and the current priority of the file Y.

Furthermore, since the task priority is 9 and higher than the current priority 1 of the file Y (operation S620: No), the file priority management part 12 inquires of the queue management part 13 about whether an I/O request for the file Y is stored in the queue C1 corresponding to the current priority 1 (operation S630).

Since the I/O requests y1 and y2 for the file Y are stored in the queue C1 corresponding to the current priority 1 (operation S640: Yes), the file priority management part 12 instructs the queue management part 13 to move the I/O requests y1 and y2. The queue management part 13 moves the I/O requests y1 and y2 stored in the queue C1 to the queue C9 corresponding to the task priority 9 (operation S650). Then, the file priority management part 12 sets the current priority of the file Y in the file priority management table 121 to the task priority 9.

Figure 27:
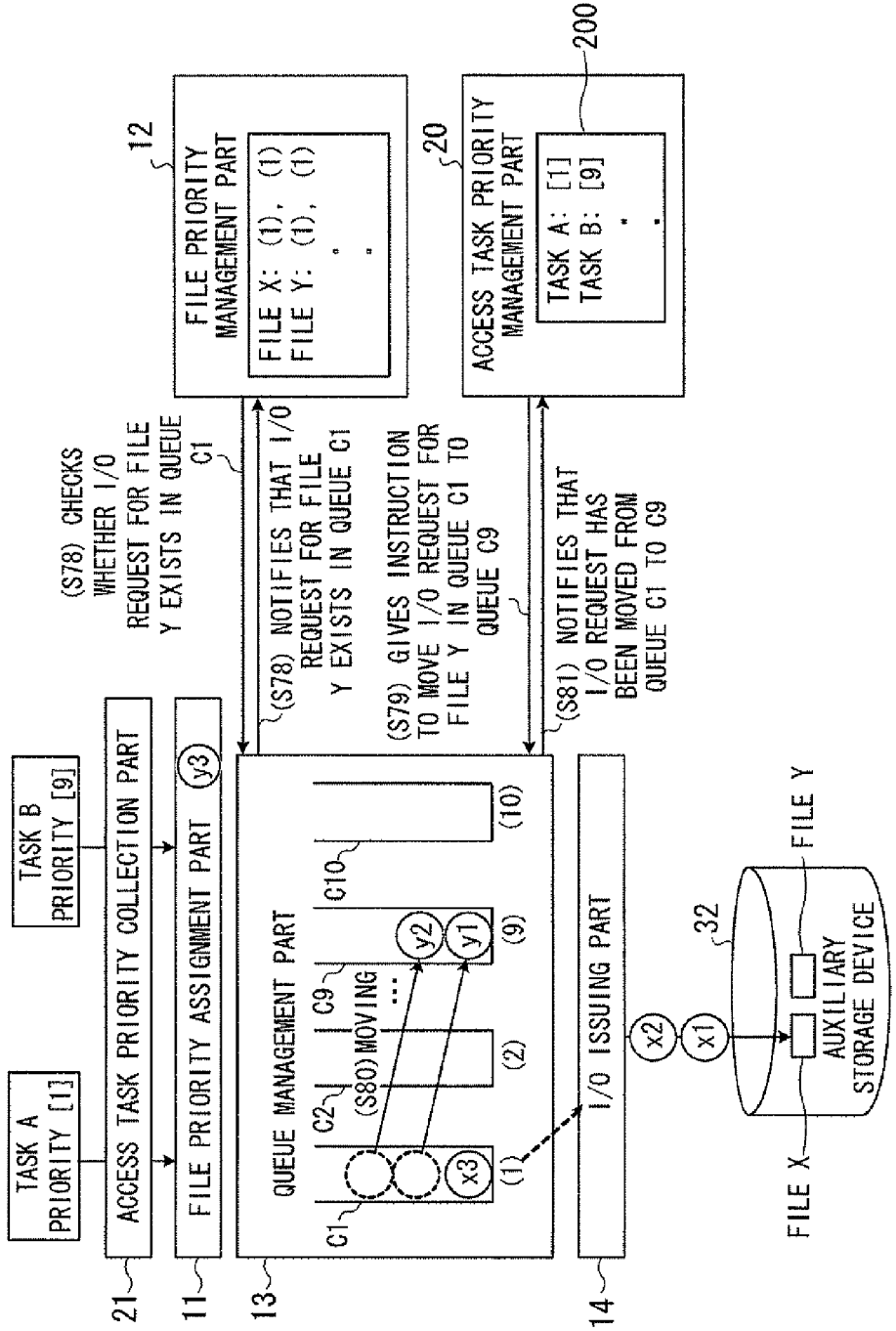
FIG. 27 is a diagram illustrating a processing procedure for an I/O access control of an I/O control apparatus of an embodiment.

Next, description will be made on a detailed processing procedures for the file priority management part 12 and the queue management part 13 to move the I/O requests y1 and y2. When the file priority management part 12 determines the new current priority as 9, the file priority management part 12 inquires of the queue management part 13 about whether an I/O request for the file Y is stored in the queue C1 corresponding to the current priority 1, as shown in FIG. 27.

The queue management part 13 checks whether an I/O request for file Y exists in queue C1 and notifies the file priority management part 12 that the I/O requests y1 and y2 for the file Y are stored in the queue C1 (operation S78). Thereby, the file priority management part 12 instructs the queue management part 13 to move the I/O requests y1 and y2 about the file Y to the queue C9 corresponding to the current priority 9 (operation S79). The queue management part 13 moves the I/O requests y1 and y2 for the file Y to the queue C9 (operation S80), and notifies the file priority management part 12 that the I/O requests y1 and y2 for the file Y are moved (operation S81).

Figure 28:
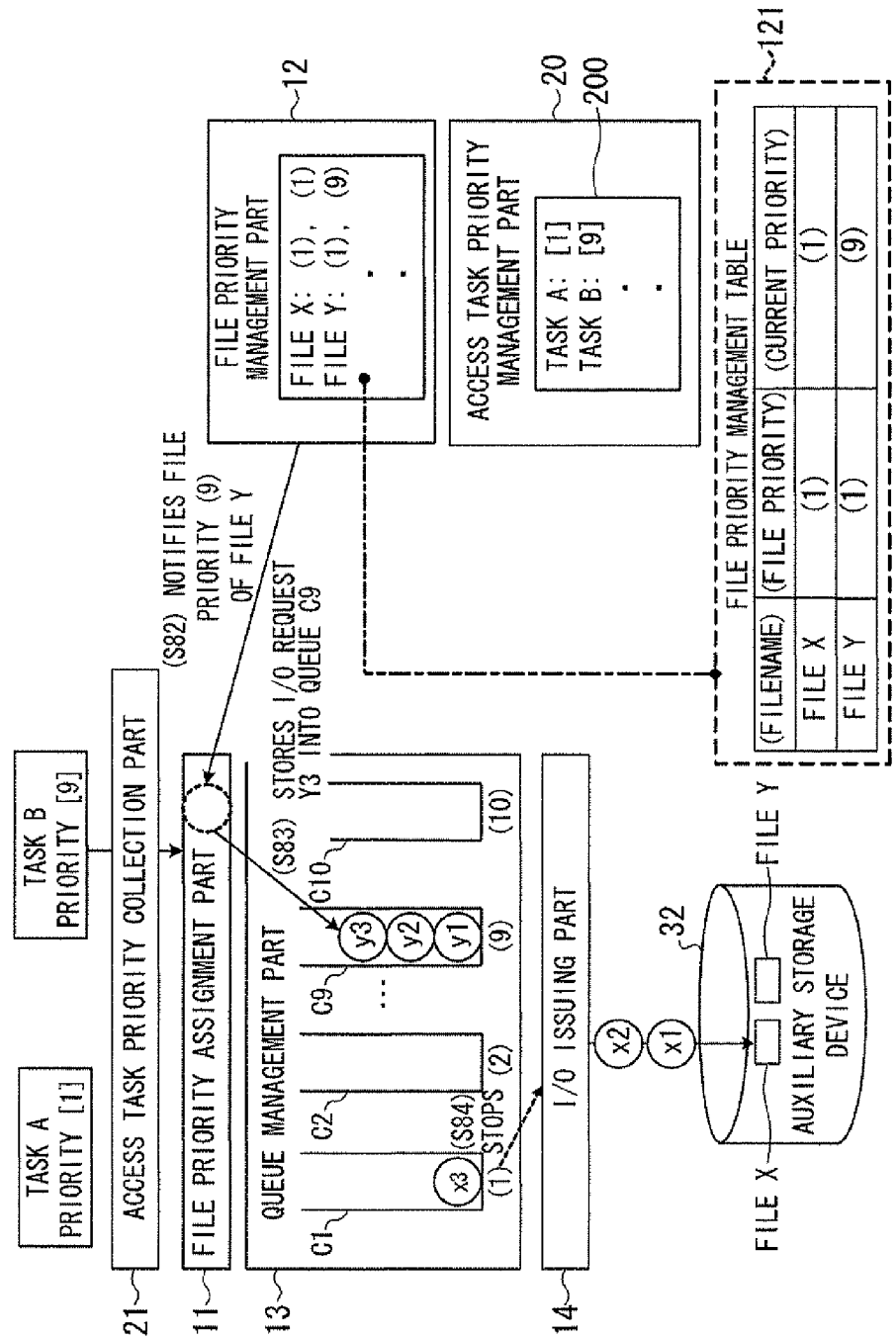
FIG. 28 is a diagram illustrating another processing procedure for an I/O access control of an I/O control apparatus of an embodiment.

Next, as shown in FIG. 28, the file priority management part 12 changes the current priority of the file Y in the file priority management table 121 to 9. Then, the file priority management part 12 notifies the changed current priority (file priority) 9 of the file Y to the file priority assignment part 11 (operation S82).

The file priority assignment part 11 instructs the queue management part 13 to store the I/O request y3 into the queue C9 corresponding to the file priority 9. Thereby, the queue management part 13 stores the I/O request y3 into the queue C9 (operation S83).

Figure 29:
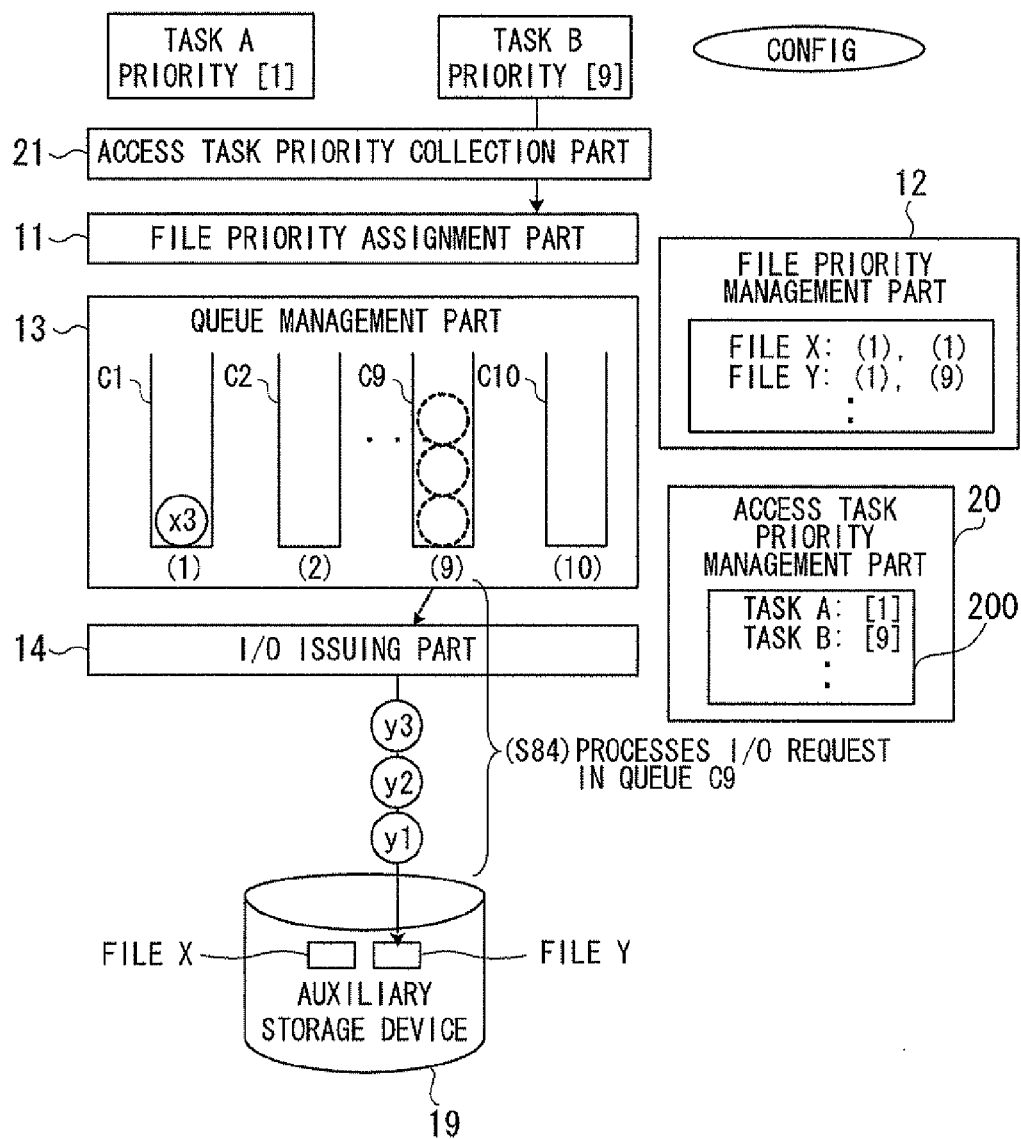
FIG. 29 is a diagram illustrating a processing procedure for an I/O access control of an I/O control apparatus of an embodiment.

Next, as shown in FIG. 29, since the I/O requests are stored into the queue C9 with the processing priority 9, the I/O issuing part 14 stops issuing an I/O request from the queue C1 with the processing priority 1 and issues the I/O requests y1, y2 and y3 in the queue C9 to the I/O device 30 (the auxiliary storage device 32 (operation S84).

Thus, it is possible to set a file priority (current priority) corresponding to the task priority of a task which has created a file, and it is possible to efficiently perform processing of I/O requests for files on the basis of the set file priorities.

As described above, a task priority of a task of accessing a file (a request source of an I/O request) is managed, and a file priority (current priority) of a file to be accessed is dynamically changed on the basis of the task priority. Thereby, it is possible to process an I/O request using the highest priority among the priorities currently set for the file to be accessed (the file priority, the task priority and the current priority). Thus, it is possible to efficiently perform processing of I/O requests for respect files.

The various processings for controlling an order of I/O requests described in the above embodiments can be realized by executing a program prepared in advance on a computer system such as a personal computer and a workstation. Therefore, a computer system which executes a program having functions similar to functions of the above-mentioned embodiments will be described below as another embodiment.

Figure 30:
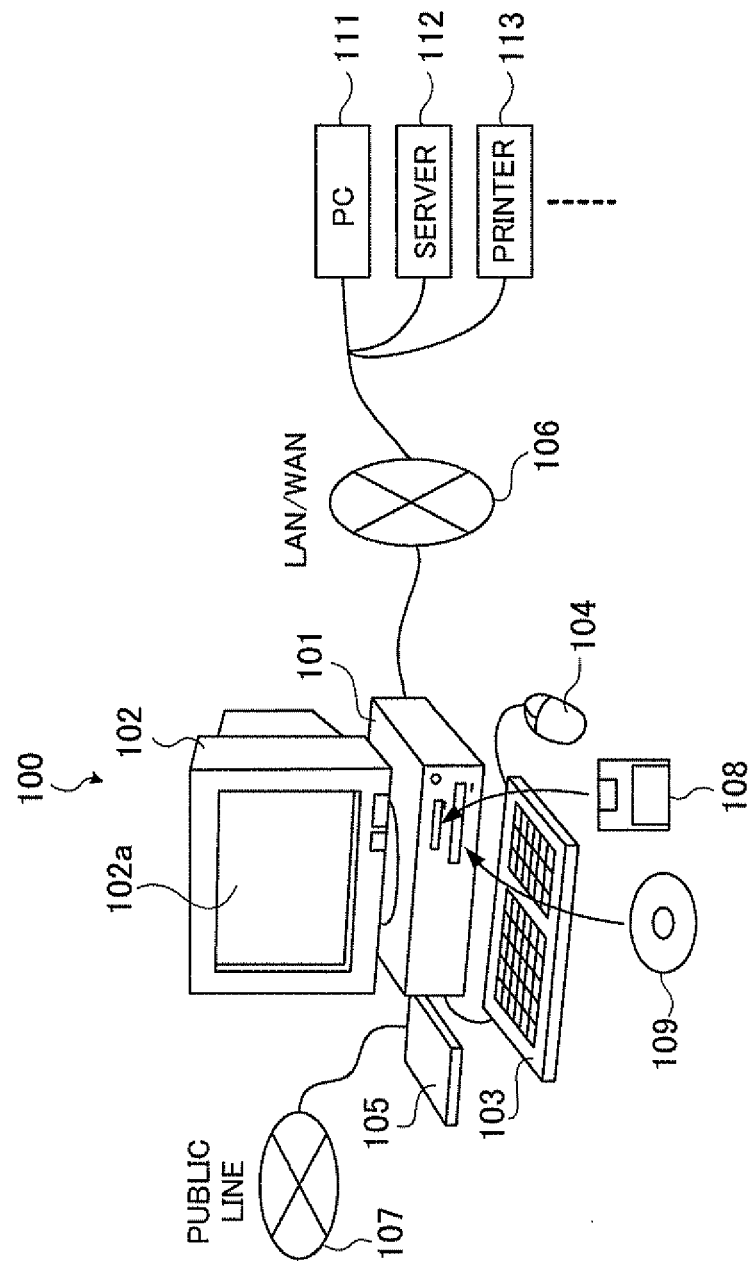
FIG. 30 is a system configuration diagram illustrating another configuration of a computer system.
Figure 31:
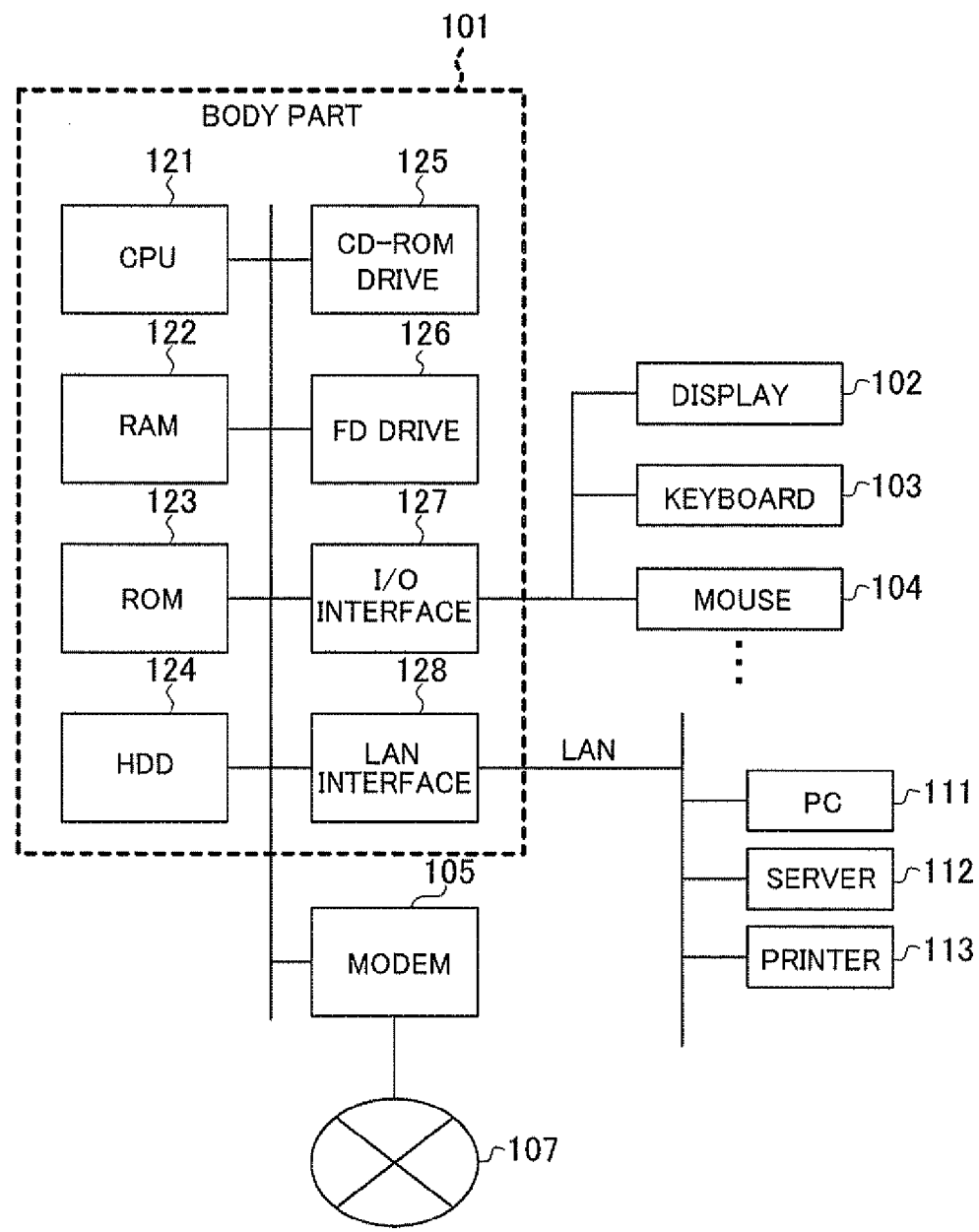
FIG. 31 is a block diagram illustrating a configuration of a body part in the computer system shown in FIG. 30.

FIG. 30 is a system configuration diagram showing the configuration of a computer system according to another embodiment, and FIG. 31 is a block diagram showing the configuration of a body part of this computer system. As shown in FIG. 30, a computer system 100 is provided with a body part 101, a display 102 displaying information such as an image on a display screen 102a in response to an instruction from the body part 101, a keyboard 103 inputting various information to the computer system 100, and a mouse 104 specifying a position (selection) on the display screen 102a of the display 102.

Furthermore, as shown in FIG. 31, the body part 101 in the computer system 100 may be provided with a CPU 121, a RAM 122, a ROM 123, a hard disk drive (HDD) 124, a CD-ROM drive 125 for accepting a CD-ROM 109, an FD drive 126 for accepting a flexible disk (FD) 108, the display 102, an I/O interface 127 connecting the keyboard 103 and the mouse 104, and a LAN interface 128 connecting to a local area network or wide area network (LAN/WAN) 106.

Furthermore, the computer system 100 may be connected with a modem 105 connecting to a public line 107 such as the Internet is connected, and another computer system (PC) 111, a server 112, a printer 113 and the like are also connected via the LAN interface 128 and the LAN/WAN 106.

The computer system 100 realizes functions similar to those of the embodiments described above by reading and executing the program recorded in a predetermined recording medium. Here, the predetermined recording medium includes all recording media for recording a program which can be read by the computer system 1001 such as "portable physical media" including the flexible disk (FD) 108, the CD-ROM 109, an MO disk, a DVD disk, a magnetic-optical disk and an IC card, "fixed physical media" including the hard disk drive (HDD) 124 provided inside or outside the computer system 100, the RAM 122 and the ROM 123, "communication media" for holding the program for a short time when the program is transmitted, like the public line 107 connected via the modem 105 and the LAN/WAN 106 to which that other computer system 111 and the server 112 are connected.

That is, the program stated in this other embodiment is computer-readably recorded in the above-described recording medium such as the "portable physical medium", "fixed physical medium" and "communication medium" described above, and the computer system 100 realizes functions similar to those of the embodiments described above by reading the program from such a recording medium and executing the program. The program stated in this other embodiment is not limited to being executed by the computer system 100. The present invention can be similarly applied to the case where that other computer system (PC) 111 or the server 112 executes the program or the case where they execute the program in cooperation with each other.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An access control apparatus that controls an I/O device to perform a file processing of access requests in a predetermined order, said access control apparatus comprising:
    a task input part which inputs access requests from multiple tasks to cause said I/O device to perform said file processing;
    a file priority management part which stores and manages information about file priorities, each file being assigned a file priority in correspondence with a processing priority;
    a file priority obtaining part which obtains a file priority corresponding to a file related to an access request among the access requests, from said file priority management part;
    a queue management part which includes multiple queues for which the processing priorities corresponding to the file priorities are set and causes the access request to be stored in any of the multiple queues corresponding to the file priority obtained by said file priority obtaining part;
    an access request sending part which obtains the access requests stored in the queues in an order based on the processing priorities set for the queues and sends the access requests to said I/O device on an access-target file side; and
    a task priority management part which stores and manages task information about task priorities indicating processing priorities of tasks, and
    wherein said file priority management part obtains file priorities corresponding to the task priorities from said task management part and stores the file priorities obtained in said file priority management part,
    wherein when receiving an access request from the task, said task priority management part stores a task priority of the task corresponding to the access request;
    said file priority management part determines a new current priority based on a current priority used currently, which is a file priority used when the access request stored in the queue is stored into the queue, the task priority and the file priority; and
    said queue management part moves the access request already stored in the queue to a queue corresponding to the new current priority determined by said file priority management part, and stores the access request which is not stored in the queue into the queue corresponding to the new current priority.

2. The access control apparatus according to the claim 1, comprising:
    a file priority registration part which registers the file priorities with said file priority management part based on an instruction inputted from outside.

3. The access control apparatus according to the claim 2, comprising:
    a file priority setting part which manages an access request frequency for each of the files and sets the file priority to each of the files based on the access request frequency.

4. The access control apparatus according to the claim 3, wherein said file priority setting part sets the file priority using a file priority stored in said file priority management part.

5. The access control apparatus according to the claim 4, comprising:
    a task priority management part which stores and manages task information about task priorities indicating processing priorities of tasks; and
    wherein said file priority management part obtains file priorities corresponding to the task priorities from said task management part and stores the file priorities obtained in said file priority management part.

6. The access control apparatus according to the claim 3, comprising:
    a task priority management part which stores and manages task information about task priorities indicating processing priorities of tasks; and
    wherein said file priority management part obtains the file priorities corresponding to the task priorities from said task management part and stores the file priorities obtained in said file priority management part.

7. The access control apparatus according to the claim 6, wherein said task priority management part stores a correspondence relationship between a task priority and the file priority as the task information in advance; and
    when receiving a request to newly create a file as the access request from the task, said file priority management part obtains a file priority corresponding to the task priority from the task information.

8. The access control apparatus according to the claim 2, comprising:
    a file priority setting part which manages an access request frequency for each of the files and sets the file priority to each of the files based on the access request frequency.

9. The access control apparatus according to the claim 8, comprising:
    a task priority management part which stores and manages task information about task priorities indicating processing priorities of tasks; and
    wherein said file priority management part obtains file priorities corresponding to the task priorities from said task management part and stores the file priorities obtained in said file priority management part.

10. The access control apparatus according to the claim 9, wherein said task priority management part stores a correspondence relationship between a task priority and the file priority as the task information in advance; and
    when receiving a request to newly create a file as the access request from the task, said file priority management part obtains a file priority corresponding to the task priority from the task information.

11. The access control apparatus according to the claim 2, comprising:
    a task priority management part which stores and manages task information about task priorities indicating processing priorities of tasks; and wherein said file priority management part obtains file priorities corresponding to the task priorities from said task management part and stores the file priorities obtained in said file priority management part.

12. The access control apparatus according to the claim 11, wherein said task priority management part stores a correspondence relationship between a task priority and the file priority as the task information; and
when receiving a request to newly create a file as the access request from the task, said file priority management part obtains a file priority corresponding to the task priority from the task information.

13. The access control apparatus according to the claim 1, wherein said task priority management part stores a correspondence relationship between a task priority and the file priority as the task information; and
when receiving a request to newly create a file as the access request from the task, said file priority management part obtains a file priority corresponding to the task priority from the task information.

14. The access control apparatus according to the claim 13, wherein when receiving an access request from the task, said task priority management part stores the task priority of the task corresponding to the access request;
said file priority management part determines a new current priority based on a current priority used currently, which is a file priority used when the access request stored in the queue is stored into the queue, the task priority and the file priority; and
said queue management part moves the access request already stored in the queue to a queue corresponding to the new current priority determined by said file priority management part, and stores the access requests which are not stored in the queue into the queue corresponding to the new current priority.

15. The access control apparatus according to the claim 13, wherein said queue management part moves the access requests between the queues in a state that processing for storing an access request into the queue and processing for sending an access request from the queue to the file side are stopped.

16. The access control apparatus according to the claim 1, wherein said queue management part moves the access requests between the queues in a state that processing for storing an access request into the queue and processing for sending an access request from the queue to the file side are stopped.

17. An access control method of controlling an I/O device to perform a file processing of access requests in a predetermined order, comprising:
inputting access requests from multiple tasks to cause said I/O device to perform said file processing;
registering information about file priorities, each file being assigned a file priority in correspondence with a processing priority;
obtaining a file priority corresponding to a file related to an access request among the access requests;
storing the access request into any queue corresponding to the file priority among multiple queues for which the processing priorities corresponding to the file priorities are set;
obtaining the access requests stored in the queues in an order based on the processing priorities set for the queues, and sending the access requests to said I/O device on an access-target file side; and
managing task information about task priorities indicating processing priorities of tasks, and
wherein file priorities corresponding to the task priorities are obtained from the task information,
wherein when receiving an access request from the task, a task priority of the task corresponding to the access request is stored;
a new current priority is determined based on a current priority used, which is a file priority used when the access request stored in the queue is stored into the queue, the task priority and the file priority; and
the access request already stored in the queue is moved to a queue corresponding to the new current priority determined, and the access request which is not stored in the queue is stored into the queue corresponding to the new current priority.

18. A non-transitory computer-readable storage medium storing a computer program for controlling an I/O device to perform a file processing of access requests in a predetermined order, said program causing an access control computer to perform operations comprising:
inputting access requests from multiple tasks to cause said I/O device to perform said file processing;
registering information about file priorities, each file being assigned a file priority in correspondence with a processing priority;
obtaining a file priority corresponding to a file related to an access request among the access requests;
storing the access request into any queue corresponding to the file priority among multiple queues for which the processing priorities corresponding to the file priorities are set;
obtaining access requests stored in the queues in a order based on the processing priorities set for the queues, and sending the access requests to said I/O device on an access target file side; and
managing task information about task priorities indicating processing priorities of tasks, and
wherein file priorities corresponding to the task priorities are obtained from the task information,
wherein when receiving an access request from the task, a task priority of the task corresponding to the access request is stored;
a new current priority is determined based on a current priority used, which is a file priority used when the access request stored in the queue is stored into the queue, the task priority and the file priority; and
the access request already stored in the queue is moved to a queue corresponding to the new current priority determined, and the access request which is not stored in the queue is stored into the queue corresponding to the new current priority.

* * * * *

UNITED STATES PATENT AND TRADEMARK OFFICE
CERTIFICATE OF CORRECTION

PATENT NO. : 8,549,526 B2  
APPLICATION NO. : 12/046740  
DATED : October 1, 2013  
INVENTOR(S) : Takashi Yamamoto et al.

Page 1 of 1

It is certified that error appears in the above-identified patent and that said Letters Patent is hereby corrected as shown below:

In the Claims
Column 26, Line 42, In Claim 18, delete "access target" and insert -- access-target --, therefor.

Signed and Sealed this
Eighteenth Day of February, 2014

Michelle K. Lee
*Deputy Director of the United States Patent and Trademark Office*